(12) United States Patent
Chan et al.

(10) Patent No.: US 11,194,424 B2
(45) Date of Patent: *Dec. 7, 2021

(54) AUDIBLE NOISE SUPPRESSION IN TOUCH DISPLAY PANEL

(71) Applicant: NOVATEK MICROELECTRONICS CORP., HsinChu (TW)

(72) Inventors: Feng-Lin Chan, Zhubei (TW);
Hung-Kai Chen, Taipei (TW);
Yuan-Fu Hsueh, Hsinchu (TW);
Chun-Yuan Pai, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,167

(22) Filed: May 18, 2020

(65) Prior Publication Data

US 2020/0278782 A1  Sep. 3, 2020

Related U.S. Application Data

(63) Continuation-in-part of application No. 15/975,810, filed on May 10, 2018, now Pat. No. 10,656,751.
(Continued)

(51) Int. Cl.
*G06F 3/041* (2006.01)

(52) U.S. Cl.
CPC ........ *G06F 3/04182* (2019.05); *G06F 3/0412* (2013.01)

(58) Field of Classification Search
CPC ......... G06F 2203/04112; G06F 3/0416; G06F 3/0418; G06F 3/044; G09G 2310/0243; G09G 2310/0264
See application file for complete search history.

(56) References Cited

U.S. PATENT DOCUMENTS

| 9,377,919 B1 | 6/2016 | Kang et al. |
| 2014/0160067 A1 | 6/2014 | Kim et al. |

(Continued)

FOREIGN PATENT DOCUMENTS

TW   201604731 A   2/2016

OTHER PUBLICATIONS

TW Office Action dated Jul. 1, 2020 in Taiwan application (No. 108139719).

(Continued)

*Primary Examiner* — Hong Zhou
(74) *Attorney, Agent, or Firm* — McClure, Qualey & Rodack, LLP

(57) ABSTRACT

The driving apparatus for driving a touch display panel includes a first voltage generating circuit configured to generate a common reference voltage, a second voltage generating circuit configured to generate a touch driving signal, and a control circuit configured to generate a switching signal. The switching signal is at the first voltage level during display periods for providing the common reference voltage to the touch display panel. The switching signal is at the second voltage level during touch periods for providing the touch driving signal to the touch display panel. A first touch display period includes a first display period a first touch period adjacent to the first display period. A second touch display period includes a second display period and a second touch period adjacent to the second display period. The first touch display period and the second touch display period are different in time length.

4 Claims, 17 Drawing Sheets

Related U.S. Application Data

(60) Provisional application No. 62/503,955, filed on May 10, 2017.

(56) References Cited

U.S. PATENT DOCUMENTS

| | | |
|---|---|---|
| 2014/0210775 A1 | 7/2014 | Ota et al. |
| 2014/0253498 A1 | 9/2014 | Suzuki et al. |
| 2014/0347318 A1 | 11/2014 | Kim |
| 2016/0034060 A1 | 2/2016 | Lin et al. |
| 2016/0085363 A1 | 3/2016 | Azumi et al. |
| 2017/0060337 A1 | 3/2017 | Kim et al. |
| 2017/0090624 A1 | 3/2017 | Kwon et al. |
| 2017/0131829 A1 | 5/2017 | Takahashi et al. |
| 2017/0177111 A1 | 6/2017 | Qin |
| 2017/0300165 A1 | 10/2017 | Shin et al. |
| 2018/0095597 A1 | 4/2018 | Kwon et al. |
| 2018/0107309 A1* | 4/2018 | Endo ................... G09G 3/3655 |
| 2018/0188863 A1* | 7/2018 | Yi ....................... G06F 3/0443 |

OTHER PUBLICATIONS

TIPO Office Action dated May 30, 2019 in Taiwan application (No. 107116001), pages.

TIPO Office Action dated 20129-01-09 in Taiwan application (No. 107116001).

* cited by examiner

AUDIBLE NOISE SUPPRESSION IN TOUCH DISPLAY PANEL

This application is a continuation-in-part application of co-pending application Ser. No. 15/975,810, filed on May 10, 2018, which claims the benefit of U.S. provisional application Ser. No. 62/503,955, filed May 10, 2017, the subject matter of which are incorporated herein by reference.

TECHNICAL FIELD

The disclosure relates in general to a touch display panel, and more particularly to a driving apparatus and a driving method for the touch display panel.

BACKGROUND

Display panel has been widely used in a variety of electronic devices in modern technology, such as cellular phone, television, personal computer, and so on. With the development of Touch with Display Driver Integration (TDDI) technology, touch and display functions may be integrated in one chip to drive a touch display panel which is a display panel with integrated touch sensing capability. The main advantages of TDDI technology include cost reduction, a thinner touch display panel, and better performance.

FIG. 1 shows a timing scheme of a driving process for driving a touch display panel and a signal waveform of a touch driving signal according to the related art. The touch display panel includes a plurality of electrodes, which may be operated as display common electrodes when displaying images or as touch electrodes when touch sensing. The touch display panel alternately operates in a display phase and a touch phase. The time length of the display phase is a display period (abbreviated as DP in the following description), and the time length of the touch phase is a touch period (abbreviated as TP in the following description). Display periods and touch periods are alternately arranged. The display period may also be called as the display part, and the touch period may also be called as the touch part. A touch display period refers to a combination of a display period and a touch period adjacent to the display period.

In the display phase, an output signal OUT as a common reference voltage VCOM, such as –0.5V, is applied from a driving chip to the touch display panel, such that the voltage measured on the electrode is the common reference voltage VCOM. In the touch phase, the output signal OUT as the touch driving signal applied to the electrode (as touch electrodes) is an alternating current (AC) signal, having a high level such as 3.5V, and a low level such as 1.5V, with a direct current (DC) component 2.5V. The DC component of the output signal OUT appears as a periodic signal, having a high level 2.5V (in the touch phase) and a low level –0.5V (in the display phase).

FIG. 2 shows an example of time arrangement of display phases and touch phases for a touch display panel according to the related art. The touch display panel is assumed with Full HD resolution (1920×1080 pixels). FIG. 2 is illustrated based on a configuration of the display frame rate 60 Hz and the touch scan rate 120 Hz. One display frame period is 16.6 ms and one touch frame period is 8.3 ms. In this example, the display frame period is equivalent to two touch frame periods. That is, for every image frame to be displayed, touch sensing (or said touch scan) for the entire touch display panel is performed twice.

Refer to FIG. 2, a touch frame period is equivalent to 12 touch display periods, and a display frame is equivalent to 24 touch display periods, wherein each touch display period includes a display period and a touch period. In a display frame period, 24 display periods and 24 touch periods are interlaced or said alternately arranged. In each display period, 1920/24=80 gate lines are sequentially turned on such that data voltages of 80 horizontal display lines (80 H) are outputted line by line to the touch display panel. After a display period (denoted as 80 H), a touch period follows.

Refer to FIG. 2 again, based on the display frame rate 60 Hz and total 24 touch display periods in a display frame period, each touch display period occupies 16.6 ms/24=694 µs, where each display period for driving 80 H occupies 504 µs (if based on a case that driving a row of pixels, i.e., a horizontal display line, costs 6.3 µs) and each touch period occupies 190 µs. Refer to the waveform shown in FIG. 1, the DC component of the output signal OUT from the driving chip appears as a periodic signal having a switching frequency (which means the display phase and touch phase are periodically switching). The switching frequency fsw is thus 1/694 µs=1.44 KHz. In this example the switching frequency 1.44 KHz is within the frequency range of audible noise, which may influence user experience when using an electronic device having the touch display panel, such as a mobile phone. There are also other frequency components (harmonic tones) with frequency that is a positive integer multiple of the base switching frequency fsw, such as the second harmonic 2×fsw, the third harmonic 3×fsw, and so on. These frequency components constitute audible noise when the touch sensing function is enabled.

SUMMARY

The disclosure is directed to a driving apparatus for a touch display panel that can effectively suppress audible noise.

According to one embodiment of the invention, a driving apparatus for driving a touch display panel is provided. The driving apparatus includes a first voltage generating circuit configured to generate a common reference voltage, a second voltage generating circuit configured to generate a touch driving signal, and a control circuit configured to generate a switching signal alternately switching between a first voltage level and a second voltage level. The switching signal is at the first voltage level during display periods for providing the common reference voltage to the touch display panel and the switching signal is at the second voltage level during touch periods for providing the touch driving signal to the touch display panel. The display periods include a first display period and a second display period. The touch periods include a first touch period adjacent to the first display period and a second touch period adjacent to the second display period. A first touch display period includes the first display period and first touch period. A second touch display period includes the second display period and the second touch period. The first touch display period and the second touch display period are different in time length.

According to one embodiment of the invention, a driving method for driving a touch display panel is provided. The driving method includes the following steps: generating a common reference voltage output to the touch display panel during display periods; generating a touch driving signal output to the touch display panel during touch periods; and generating a switching signal alternately switching between a first voltage level and a second voltage level. The switching signal is at the first voltage level during the display periods for providing the common reference voltage to the touch display panel and the switching signal is at the second voltage level during the touch periods for providing the touch driving signal to the touch display panel. The display periods include a first display period and a second display period. The touch periods include a first touch period adjacent to the first display period and a second touch period adjacent to the second display period. A first touch display period includes the first display period and first touch period. A second touch display period includes the second display period and the second touch period. The first touch display period and the second touch display period are different in time length.

According to one embodiment of the invention, a driving apparatus for driving a touch display panel is provided. The driving apparatus includes a first voltage generating circuit configured to generate a common reference voltage, a second voltage generating circuit configured to generate a touch driving signal, and an output node. The common reference voltage is output to the touch display panel through the output node during display periods and the touch driving signal is output to the touch display panel through the output node during touch periods. The display periods and the touch periods are alternately arranged. The display periods include a first display period and a second display period. The touch periods include a first touch period adjacent to the first display period and a second touch period adjacent to the second display period. A first touch display period includes the first display period and first touch period. A second touch display period includes the second display period and the second touch period. The first touch display period and the second touch display period are different in time length.

According to one embodiment of the invention, a driving apparatus for driving a touch display panel is provided. The driving apparatus includes a first voltage generating circuit configured to generate a common reference voltage, and a second voltage generating circuit configured to generate a touch driving signal. The common reference voltage is output to the touch display panel during display periods and the touch driving signal is output to the touch display panel during touch periods. The display periods and the touch periods are alternately arranged. The touch driving signal has a first waveform during a first touch period of the touch periods and has a second waveform during a second touch period of the touch periods, and the first waveform is configured to be different from the second waveform.

According to one embodiment of the invention, a driving apparatus for driving a touch display panel is provided. The driving apparatus includes a first voltage generating circuit configured to generate a common reference voltage, a second voltage generating circuit configured to generate a touch driving signal, and an output node. In a first touch frame period having K touch periods, the touch driving signal is output to the touch display panel through the output node during N touch periods and is not output to the touch display panel during M touch periods, wherein K, M, N are integers and K is the sum of M and N. In a second touch frame period having K touch periods, the touch driving signal is output to the touch display panel through the output node during P touch periods and is not output to the touch display panel during Q touch periods, wherein P and Q are integers and K is also the sum of P and Q. Chronological orders of the N touch periods in the first touch frame period are different from chronological orders of the P touch periods in the second touch frame period.

The invention will become apparent from the following detailed description of the preferred but non-limiting embodiments. The following description is made with reference to the accompanying drawings.

Figure 1:
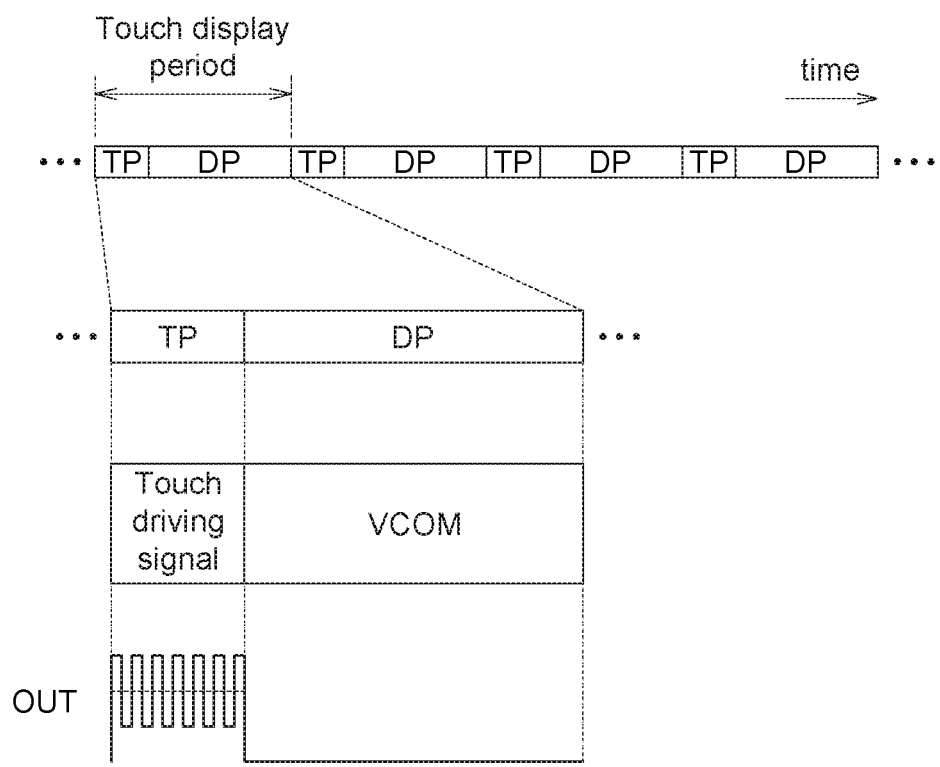
FIG. 1 (related art) shows a timing scheme of a driving process and a signal waveform of a touch driving signal according to the related art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 3:
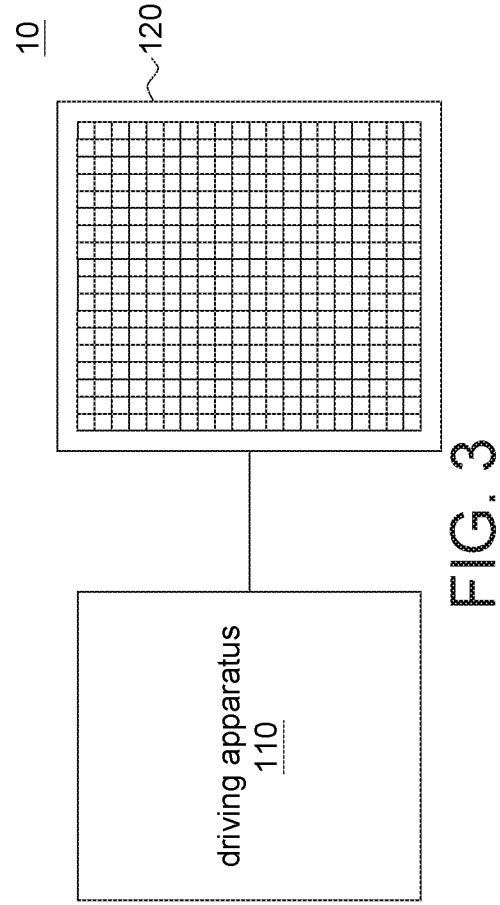
FIG. 3 shows a display apparatus according to one embodiment of the invention.

FIG. 3 shows a display apparatus 10 according to one embodiment of the invention. For example, the display apparatus 10 may be a mobile phone or a tablet. However, the invention is not limited thereto. The display apparatus 10 includes a driving apparatus 110 and a touch display panel 120, and may alternately operate in a display phase and a touch phase. In the following description, the touch display panel 120 with Full HD resolution (1920×1080 pixels), having 1920 horizontal display lines, display frame rate 60 Hz, and touch scan rate (or called touch report rate) 120 Hz will be used as an illustrative example. Image data are written to a horizontal display line (i.e., a row of pixels in the touch display panel 120) in the display phase, and touch sensing is performed in the touch phase. Other panel resolution and display frame rate/touch frame rate may also be applicable. A horizontal display line is represented as "H" in the following description. Though not shown in FIG. 3, there may be the $1^{st}$ gate line to the $1920^{th}$ gate line, from the top to the bottom of the touch display panel 120. Through a gate line, a gate driving signal controlling thin-film transistor (TFT) switches of a horizontal display line is provided, such that the total 1920 horizontal display lines are respectively controlled by the gate lines.

The time length of the display phase is a display period and the time length of the touch phase is a touch period. The timing scheme of a driving process for driving the touch display panel 120 may be divided into a plurality of display periods and a plurality of touch period, which are alternately arranged. A touch display period refers to a combination of a display period and a touch period adjacent to the display period.

In the following description, the touch display panel 120 including m×n electrodes (m rows×n columns) is taken as an illustrative example. Each block illustrated in FIG. 3 in the touch display panel 120 represents a region where an electrode is located. These electrodes may be used as common reference electrodes providing a common reference voltage (VCOM) to pixel units in the display phase and used as touch electrodes in the touch phase. Herein, the touch electrodes may be sensing electrodes for self-capacitive touch sensing or driving electrodes for mutual capacitive touch sensing. In an exemplary touch sensing scheme, total n touch electrode columns are scanned in one touch frame period, wherein every two touch electrode columns, one in the left-half of the touch display panel 120 and the other in the right-half of the touch display panel 120, are scanned simultaneously.

Figure 4:
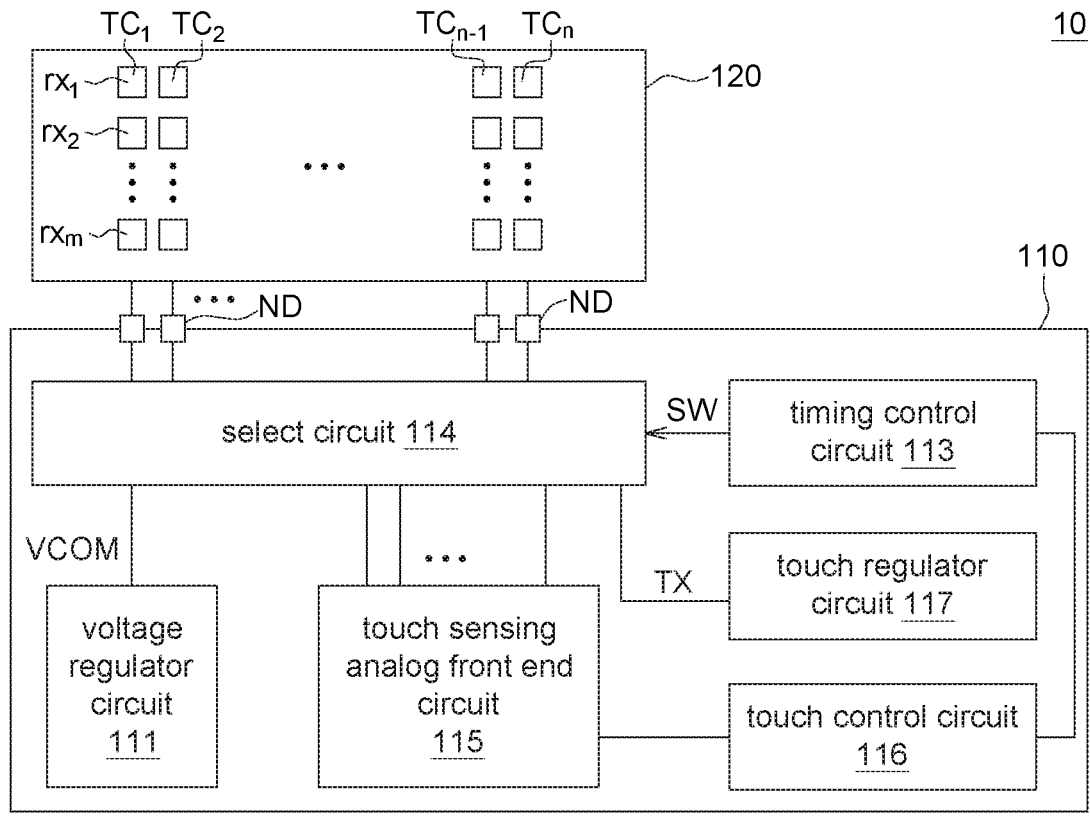
FIG. 4 shows a block diagram of a display apparatus according to one embodiment of the invention.

FIG. 4 shows a block diagram of the display apparatus 10 in more detail. The touch display panel 120 includes m×n electrodes, denoted as touch electrode columns $TC_1$-$TC_n$, where each touch electrode column has touch electrodes $rx_1$-$rx_m$. In the following description, m is 30 and n is 18 as an example. The driving apparatus 110 includes a voltage regulator circuit 111, a touch regular circuit 117, a timing control circuit 113, a select circuit 114, a touch sensing analog front end (AFE) circuit 115, and a touch control circuit 116. The driving apparatus 110 also includes a plurality of output nodes ND. The voltage regulator circuit 111 (a first voltage generating circuit) is configured to generate a common reference voltage VCOM. The touch regulator circuit 117 (a second voltage generating circuit) is configured to generate a touch driving signal TX. The timing control circuit 113 is configured to generate a switching signal SW, which is alternately switching between a first voltage level (such as a logic low level) and a second voltage level (such as a logic high level). The switching signal SW is at the first voltage level during a plurality of display periods for providing the common reference voltage VCOM to the touch display panel 120, and the switching signal SW is at the second voltage level during a plurality of touch periods for providing the touch driving signal TX to the touch display panel 120. More detailed description related to the arrangement of the display periods and the touch periods are given in later description and in FIG. 6. The switching signal SW is output to the select circuit 114.

The select circuit 114 is coupled to the output nodes ND. The select circuit 114 is configured to alternately couple the common reference voltage VCOM and the touch driving signal TX to the touch display panel 120 through the output node ND according to the switching signal SW. As to the output node ND, the common reference voltage VCOM is output to the touch display panel 120 through the output node ND during the display periods and the touch driving signal TX is output to the touch display panel 120 through the output node ND during the touch periods. In other words, an output signal (which is also denoted as ND in later FIG. 6) through the output node ND during the display periods is the common reference voltage VCOM, and the output signal through the output node ND during the touch periods includes the touch driving signal TX. The touch display panel 120 may include its own select circuit to receive the output signal (as VCOM or TX) from the output node ND and couple the output signal to common reference electrodes which require VCOM in the display periods and to touch electrodes which require TX in the touch periods.

The touch sensing AFE circuit 115 may be configured to receive sensing signals from the touch electrodes in the touch display panel 120. It is noted that in self-capacitive touch sensing, the sensing signal and a driving signal with respect to a touch electrode are transmitted on the same signal line (therefore they are regarded as one signal), while in mutual capacitive touch sensing, the sensing signal and the touch driving signal TX with respect to a touch electrode are separate signals. In the case of self-capacitive touch sensing, the touch driving signal TX may be transmitted to the touch sensing AFE circuit 115 then transmitted to the select circuit 114. In the case of mutual capacitive touch sensing, the touch driving signal TX may be transmitted to the select circuit 114 without being transmitted through the touch sensing AFE circuit 115. The touch control circuit 116 may be a digital circuit for processing the sensing signal from the touch sensing AFE circuit 115 to generate touch information. An analog-to-digital converter may be included in the touch control circuit 116 for example.

Figure 5:
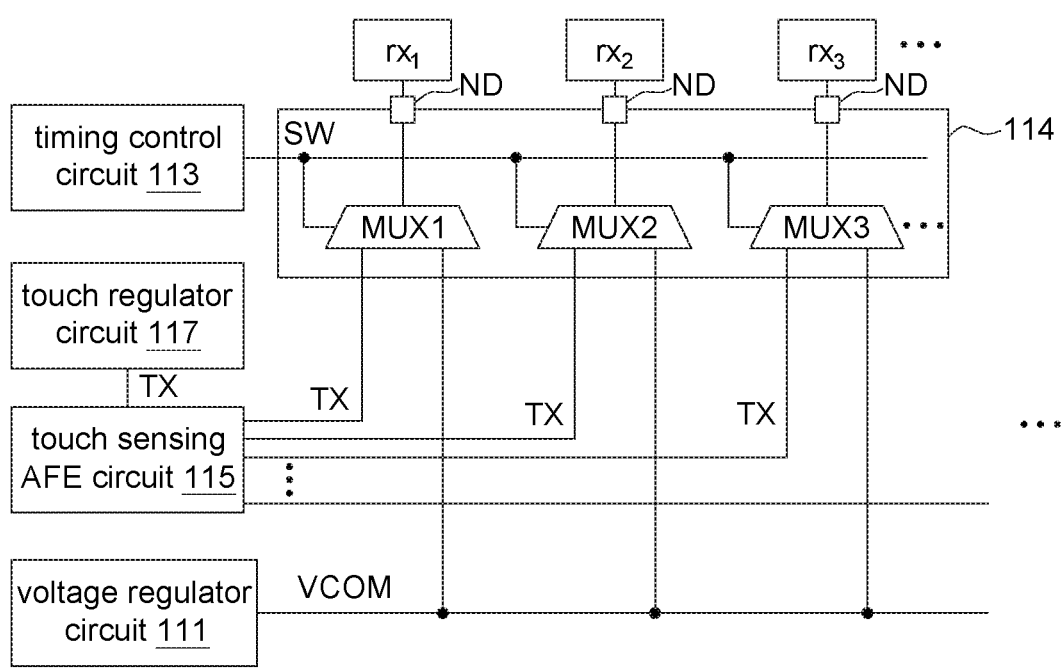
FIG. 5 shows a schematic diagram of the select circuit shown in FIG. 4 according to one embodiment of the invention.

FIG. 5 shows a schematic diagram of the select circuit 114 shown in FIG. 4 according to one embodiment of the invention. In this embodiment, the select circuit 114 includes multiple multiplexers MUX1, MUX2, MUX3, and so on. Each touch electrode, denoted as $rx_1$, $rx_2$, $rx_3$, etc., of a touch electrode column in the touch display panel 120 is coupled to a corresponding multiplexer. Taking the multiplexer MUX1 for example, the multiplexer MUX1 alternately couples the touch driving signal TX from the touch sensing AFE circuit 115 and the common reference voltage VCOM from the voltage regulator circuit 111 to the touch display panel 120 through the corresponding output node ND, according to the switching signal SW generated by the timing control circuit 113. In the example of FIG. 5, the touch driving signal TX is originally provided from the touch regulator circuit 117, and the touch driving signal TX and the sensing signal (received from the touch electrode) are on the same signal line.

In one embodiment, the select circuit 114 may be disposed in the driving apparatus 110, such as the schematic diagram shown in FIG. 4. The driving apparatus 110 is, for example, a driver integrated circuit (IC) separately from the touch display panel 120. In another embodiment, the select circuit 114 or a part of the select circuit 114 may be implemented in the touch display panel 120.

The display periods during which the common reference voltage VCOM is output to the touch display panel 120 comprise at least a first display period and a second display period. The touch periods during which the touch driving signal TX is output to the touch display panel 120 comprise a first touch period and a second touch period. The first touch period is adjacent to the first display period, and the second touch period is adjacent to the second display period. The first display period and the first touch period in combination is a first touch display period. The second display period and the second touch period in combination is a second touch display period. A characteristic of embodiments of the invention is that the first touch display period and the second touch display period are different in time length. The first touch display period and the second touch display period may be in different touch frame period or in the same touch frame period.

Figure 2:
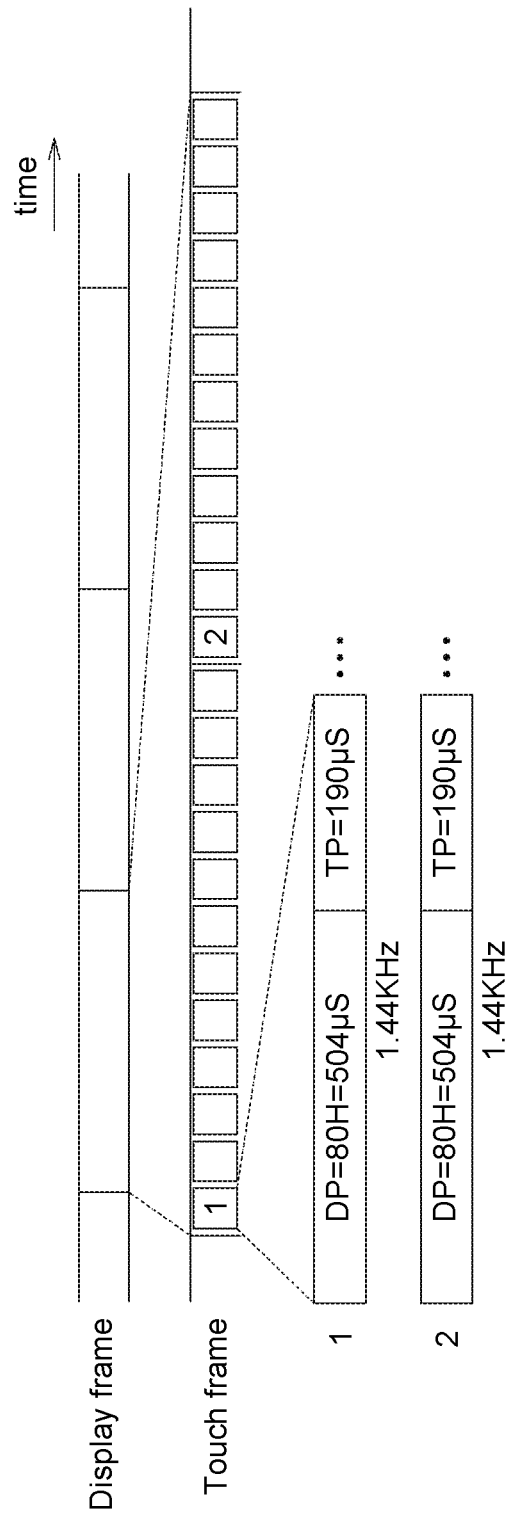
FIG. 2 (related art) shows an example of time arrangement of display phases and touch phases for a touch display panel according to the related art.
Figure 6:
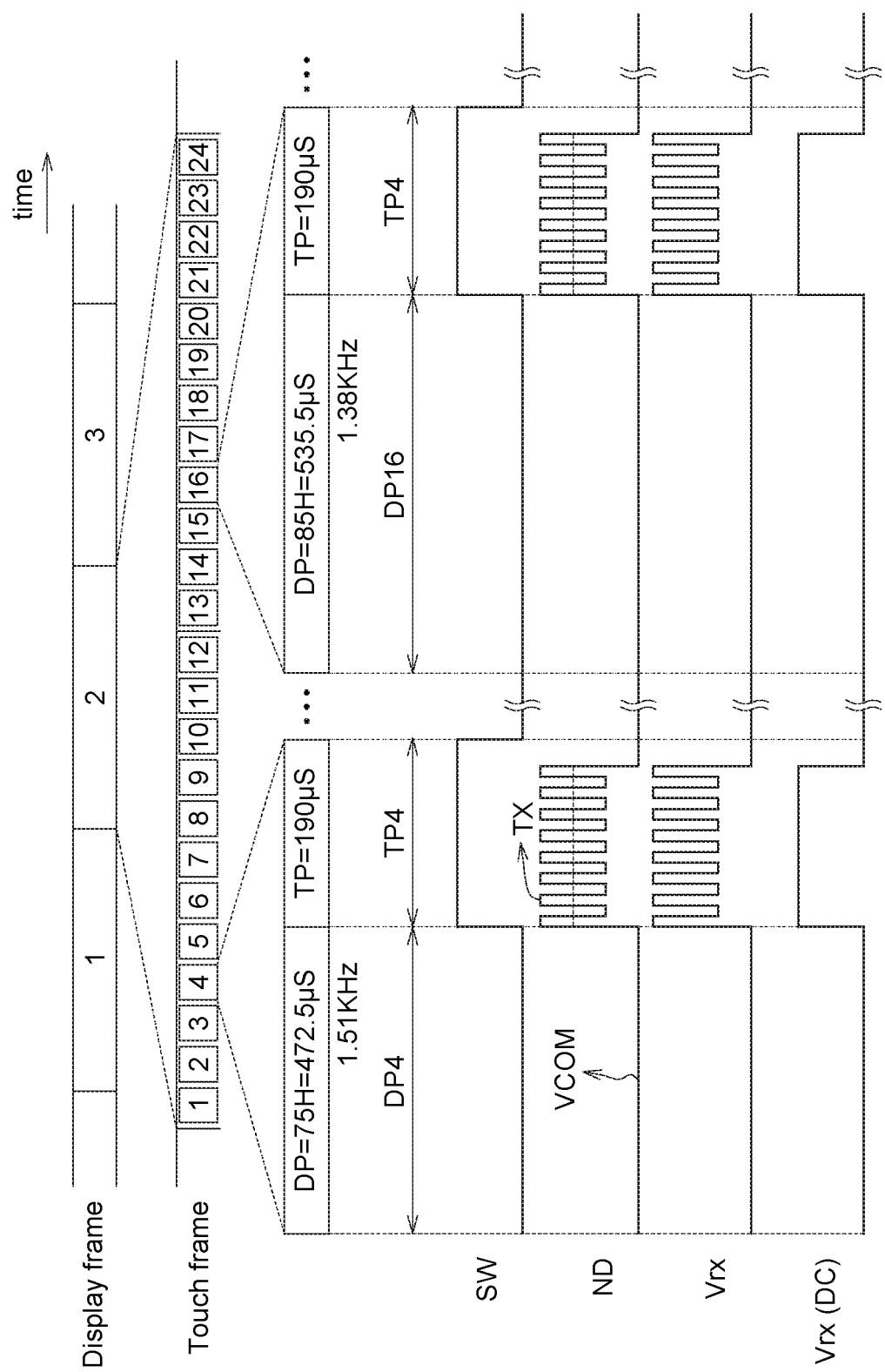
FIG. 6 shows a touch frame based display period adjustment according to one embodiment of the invention.

FIG. 6 shows a touch frame based adjustment for the display periods within a display frame period according to one embodiment of the invention. In this embodiment, the timing scheme of touch display periods in the first display frame (display frame 1 in FIG. 6) may be the same as that shown in FIG. 2. The timing scheme of touch display periods in the second display frame (display frame 2 in FIG. 6) next to the first display frame may be different from the first display frame. Herein, each display frame period equals two touch frame periods; each display frame period equals 24 touch display periods, denoted as 1 to 24, and each touch frame period equals 12 touch display periods. In the second display frame, 12 display periods in the first touch frame period is set as the time length of driving 75 horizontal display lines (75 H), which may be 472.5 μs if driving a horizontal display line costs 6.3 μs and a display frame rate is 60 Hz. 12 display period in the second touch frame period is set as the time length of driving 85 horizontal display lines (85 H), which may be 535.5 μs (equals 85*6.3 μs). In each touch frame period, each touch period may be 190 μs. As the example shown in FIG. 6, the 4$^{th}$ touch display period in the first touch frame period (in the second display frame period) includes the display period DP4 and the touch period TP4, equivalent to 472.5 μs+190 μs=662.5 μs; the 4$^{th}$ touch display period in the second touch frame period (also regarded as the 16$^{th}$ touch display period in the second display frame) includes the display period DP16 and another touch period TP4, equivalent to 535.5 μs+190 μs=725.5 μs. The 4$^{th}$ touch display period in the first touch frame period and the 4$^{th}$ touch display period in the second touch frame period have different time length.

Refer to FIG. 4 and FIG. 5 again, the select circuit 114 couples the common reference voltage VCOM to the output node ND when the switching signal SW is in the logic low level and couples the touch driving signal TX to the output node ND when the switching signal SW is in the logic high level. Hence, an output signal (which is also denoted as ND in the waveform shown in FIG. 6) through the output node ND during the display periods is the common reference voltage VCOM, and the output signal through the output node ND during the touch periods includes the touch driving signal TX. The active period of the touch driving signal TX, which means a time length during which TX has pulses, may be less than an entire touch period.

Therefore, in the first touch frame period, the switching frequency fsw of the display phase and the touch phase becomes 1/(472.5 μs+190 μs)=1.51 KHz. In another perspective, the switching frequency fsw=1.51 KHz can be regarded as a switching frequency of a direct current (DC) component of the output signal output through the output node ND during the first touch frame period. In the second touch frame period, the switching frequency fsw of the display phase and the touch phase becomes 1/(535.5 μs+190 μs)=1.38 KHz. In another perspective, the switching frequency fsw=1.38 KHz can be regarded as a switching frequency of the DC component of the output signal output through the output node ND during the second touch frame period. The DC component of the output signal is remarked by dot lines in the ND waveform in FIG. 6. The voltage signal measured on different electrodes of the touch display panel 120 may be depicted as Vrx waveform in FIG. 6, and a DC component of the measured voltage signal may be depicted as Vrx(DC) waveform in FIG. 6. Vrx and Vrx(DC) does not illustrate a signal measured on a single electrode but multiple signals measured on different electrodes at different periods.

This example in FIG. 6 may be represented as [75 H, 85 H] configuration for this display frame (the second display frame). In the case that a display frame period is equivalent to two touch frame periods, [xH, yH] represents the configuration of the number of horizontal display lines, wherein x is the number of horizontal display lines driven in every display period during the first touch frame period, and y is the number of horizontal display lines driven in every display period during the second touch frame period. Since the display period in the first touch frame period differs from the display period in the second touch frame period, this approach is referred to as touch frame based display period adjustment.

Figure 7:
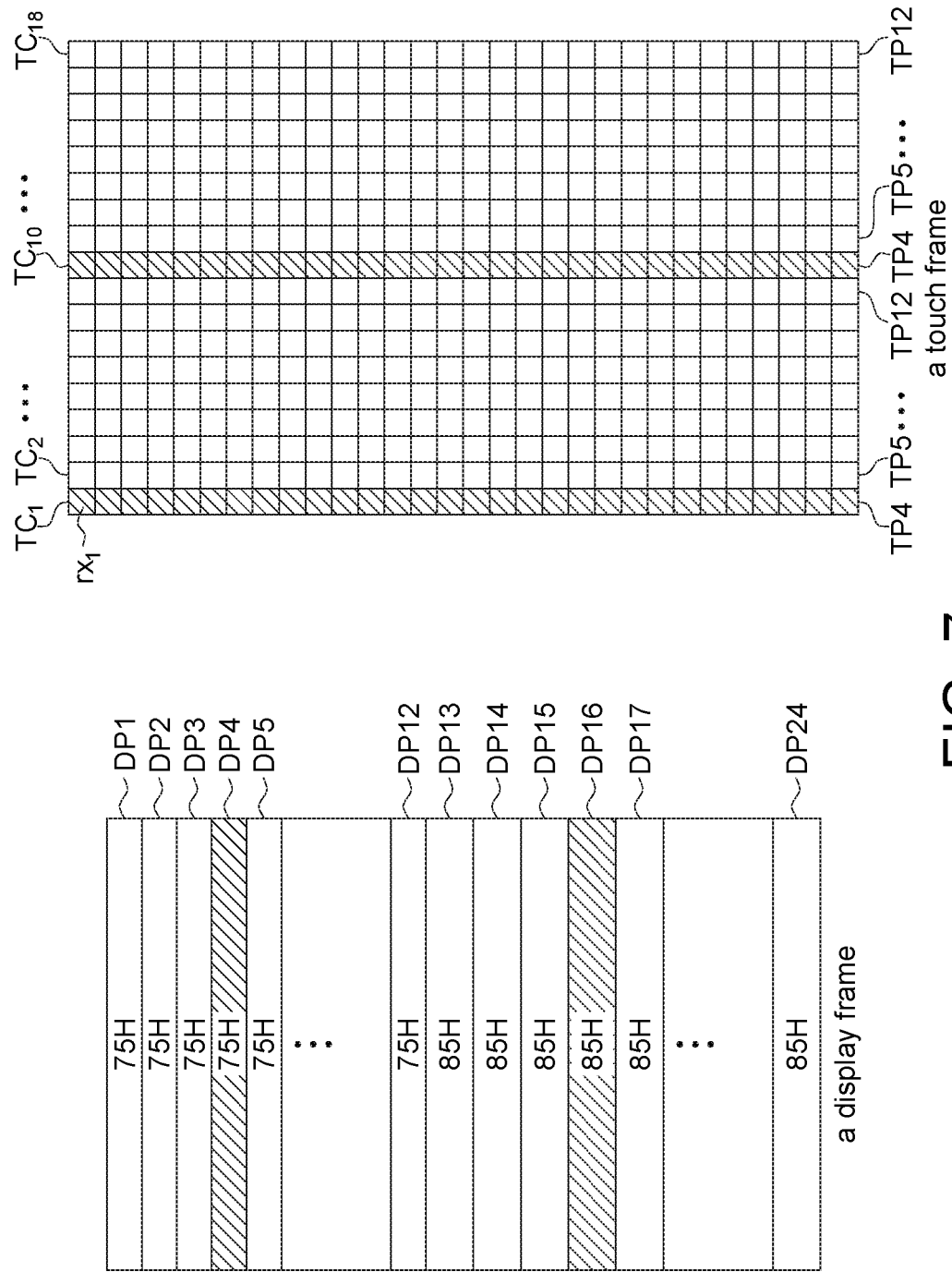
FIG. 7 shows a diagram illustrating the example of touch frame based display period adjustment with [75 H, 85 H] configuration according to one embodiment of the invention.

The example illustrated in FIG. 6 can be more clearly understood when referring to FIG. 7. FIG. 7 shows a diagram illustrating the example of touch frame based display period adjustment with [75 H, 85 H] configuration in FIG. 6. Refer to FIG. 6 and FIG. 7, in the 4$^{th}$ display period (DP4) of the second display frame period, Vrx can be measured on common reference electrodes corresponding to the 75 horizontal display lines which display image data during the display period DP4; in the 4$^{th}$ touch period (TP4) of the first touch frame period, Vrx can be measured on touch electrodes (which are the touch electrode columns TC1 and TC10 as shown in FIG. 7) corresponding to the touch period TP4 of the first touch frame period; in the 16$^{th}$ display period (DP16) of the second display frame period, Vrx can be measured on common reference electrodes corresponding to the 85 horizontal display lines which display image data during the display period DP16; and in a touch period adjacent to the display period DP16, denoted as the 4$^{th}$ touch period (TP4) of the second touch frame period, Vrx can be measured on touch electrodes (which are also the touch electrode columns TC1 and TC10) corresponding to the touch period TP4 of the second touch frame period.

Based on configuration given in FIG. 7, an exemplary driving process for displaying an image frame and performing touch sensing on the touch display panel 120 may include the following display periods and touch periods arranged alternately: (1) display period DP1 (driving 75 horizontal display lines 1-75); (2) touch period TP1 (noise detection for the touch display panel 120); (3) display period DP2 (driving 75 horizontal display lines 76-150); (4) touch period TP2 (noise detection); (5) display period DP3 (drive 75 horizontal display lines 151-225); (6) touch period TP3 (noise detection); (7) display period DP4 (driving 75 horizontal display lines 226-300); (8) touch period TP4 (touch sensing on the touch electrode columns TC1 and TC10); (9) display period DP5 (driving 75 horizontal display lines 301-375); (10) touch period TP5 (touch sensing on the touch electrode columns TC2 and TC11); . . . (23) display period DP12 (driving 75 horizontal display lines 826-900); (24) touch period TP12 (touch sensing on the touch electrode columns TC9 and TC18). At this point, the upper half of the touch display panel 120 has been driven to display image data, and the touch sensing (touch scan) has been completed once on the entire touch display panel 120, i.e., a touch frame is completed. Then the above procedure is repeated for the lower half of the touch display panel 120, including following sequential display periods and touch periods: (25) display period DP13 (driving 85 horizontal display lines 901-985); (26) touch period TP1 (noise detection); (27) display period DP14 (driving 85 horizontal display lines 986-1070); (28) touch period TP2 (noise detection); (29) display period DP15 (driving 85 horizontal display lines 1071-1155); (30) touch period TP3 (noise detection); (31) display period DP16 (driving 85 horizontal display lines 1156-1240); (32) touch period TP4 (touch sensing on the touch electrode columns TC1 and TC10); (33) display period DP17 (driving 85 horizontal display lines 1241-1325); (34) touch period TP5 (touch sensing on the touch electrode columns TC2 and TC11); . . . (47) display period DP24 (driving 85 horizontal display lines 1836-1920); (48) touch period TP12 (touch sensing on the touch electrode columns TC9 and TC18). At this point the entire touch display panel 120 has been driven completely to display image data, and the touch scan has been performed thoroughly twice on the touch display panel 120.

Figure 8:
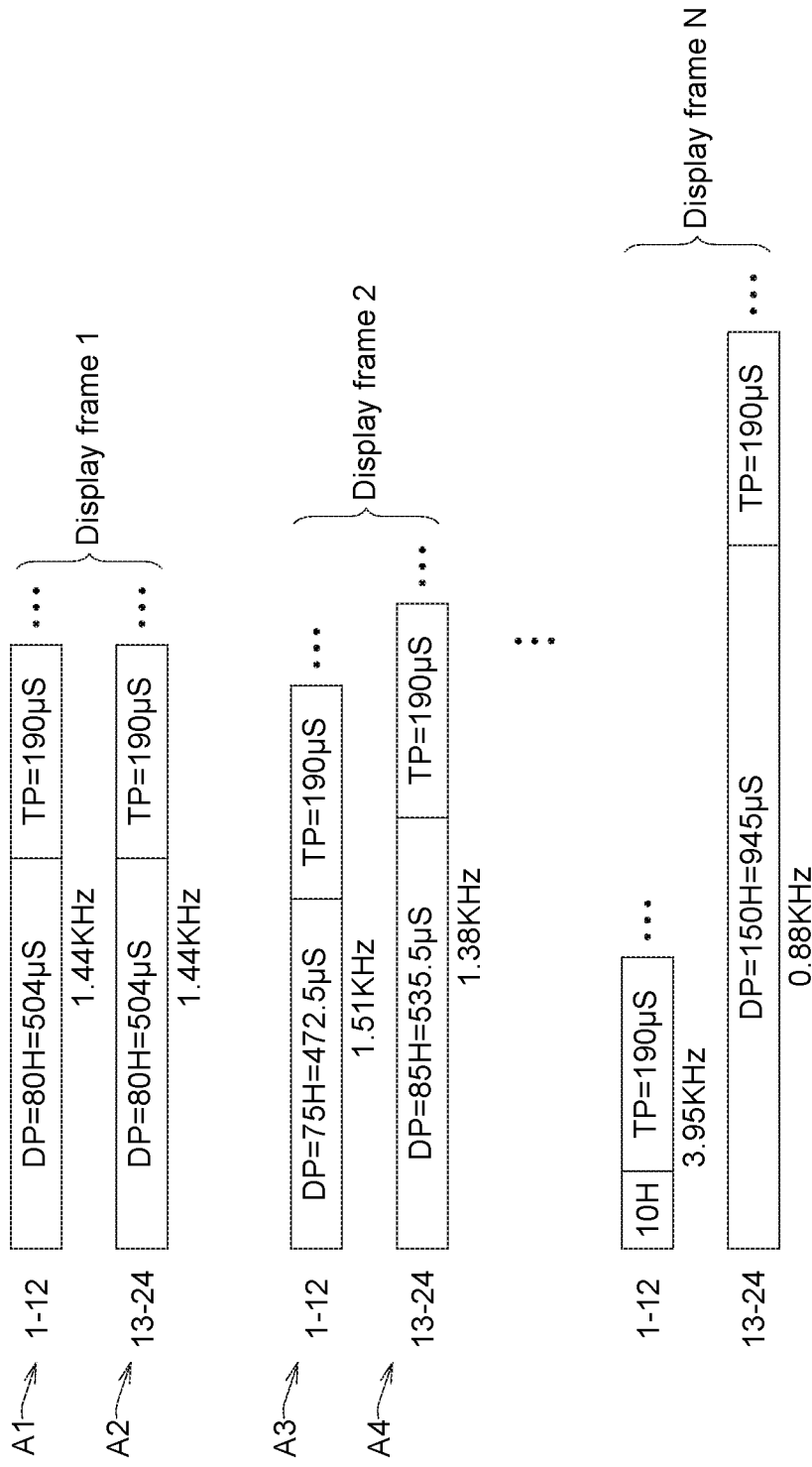
FIG. 8 shows a touch frame based display period adjustment for multiple display frame periods according to one embodiment of the invention.

According to the embodiment of FIG. 6, each display frame may have a different configuration of the display periods. For example, configuration of the first display frame is [80 H, 80 H], the configuration of the second display frame is [75 H, 85 H] (illustrated in FIG. 6), configuration of the third display frame is [70 H, 90 H], configuration the fourth display frame is [65 H, 95 H], . . . , and so on. There may be several different available configurations as long as the total number of horizontal display lines driven in a display frame keeps the same. For example, a configuration [10 H, 150 H] that generates the switching frequency fsw=3.95 KHz in the first touch frame period and 0.88 KHz in the second touch frame period is also applicable as long as the display quality is not reduced. FIG. 8 shows touch frame based display period adjustment for multiple display frame periods according to one embodiment of the invention. Different display frames use different configurations (or saying different touch frames use different configurations), such as the switching frequency of the display phase and the touch phase in a touch frame period A3, 1.51 KHz, is different from the switching frequency of the display phase and the touch phase in a touch frame period A2, 1.44 KHz, and the switching frequency of the display phase and the touch phase in a touch frame period A4, 1.38 KHz, is different from the switching frequency of the display phase and the touch phase in the touch frame period A3, 1.51 KHz. In other words, the switching frequency of the DC component of the output signal output through the output node ND to the touch display panel 120 varies by touch frame periods. The switching frequency of the display phase and the touch phase in all touch frame periods do not always keep in the same 1.44 KHz which brings audible noise. Consequently, the audible noise may be eliminated and may be less heard by the user of the display apparatus 10.

The configurations for multiple display frames may change in a repeated way. For example, the configuration for consecutive display frames may be: [80 H, 80 H], [75 H, 85 H], [70 H, 90 H], . . . , [10 H, 150 H], [80 H, 80 H], [75 H, 85 H], [70 H, 90 H], . . . , [10 H, 150 H]. Alternatively, the sequence may be cycled in a reverse order. For example: [80 H, 80 H], [75 H, 85 H], . . . , [20 H, 140 H], [10 H, 150 H], [10 H, 150 H], [20 H, 140 H], . . . , [75 H, 85 H], [80 H, 80 H]. In another embodiment, the configuration sequence may be random in order without repeating.

To implement the different configurations of display periods, in one embodiment, the driving apparatus 110 may include multiple registers for storing the configurations associated with time lengths of different display periods, which may be represented by the number of horizontal display lines, such as 80 H, 75 H, 85 H, etc. The driving apparatus 110 may also include a register for storing the configuration associated with time length of the touch period, which can be also represented by the number of the horizontal display lines, such as 30 H (approximate to 190 μs). Wherein, one horizontal display line (1 H) period may be equal to the period of a horizontal synchronization signal. Referring to the example shown in FIG. 4 and FIG. 5, the timing control circuit 113 may generate the switching signal SW for the select circuit 114 according to the values stored in the registers associated with the display periods and the touch period. As such, the timing control circuit 113 is able to determine when the switching signal SW transitions from low to high or high to low according to the values stored in the registers.

To implement the different configurations of display periods, in another embodiment, the driving apparatus 110 may include a counter for counting how many clock periods of a pixel clock signal have elapsed. When a predetermined counting value is reached, the counter may notify the timing control circuit 113 to toggle the switching signal SW from low to high or high to low. For example, the driving apparatus 110 may include one or more counters whose target values are related to different data amount for different number of horizontal lines such as 80 H, 75 H, 85 H, etc., and include another counter whose target value is related to how long the touch period is.

Note that 12 touch periods (3 for noise detection and 9 for touch sensing) in a touch frame period illustrated in FIG. 7 is merely exemplary rather than limiting. In another embodiment, the touch sensing (touch scan) for the entire touch display panel may also be divided into 4 touch periods or other number of touch periods, which can be determined by the complexity of the touch sensing AFE circuit. For example, the first one of the 4 touch periods is reserved for noise detection and the other 3 of the 4 touch periods are for touch sensing. In a case of each display frame period equivalent to two touch frame periods, the period of driving the horizontal display lines of the touch display panel is divided into 8 display periods. In each display period, 1920/8=240 horizontal display lines sequentially display image data.

Figure 9:
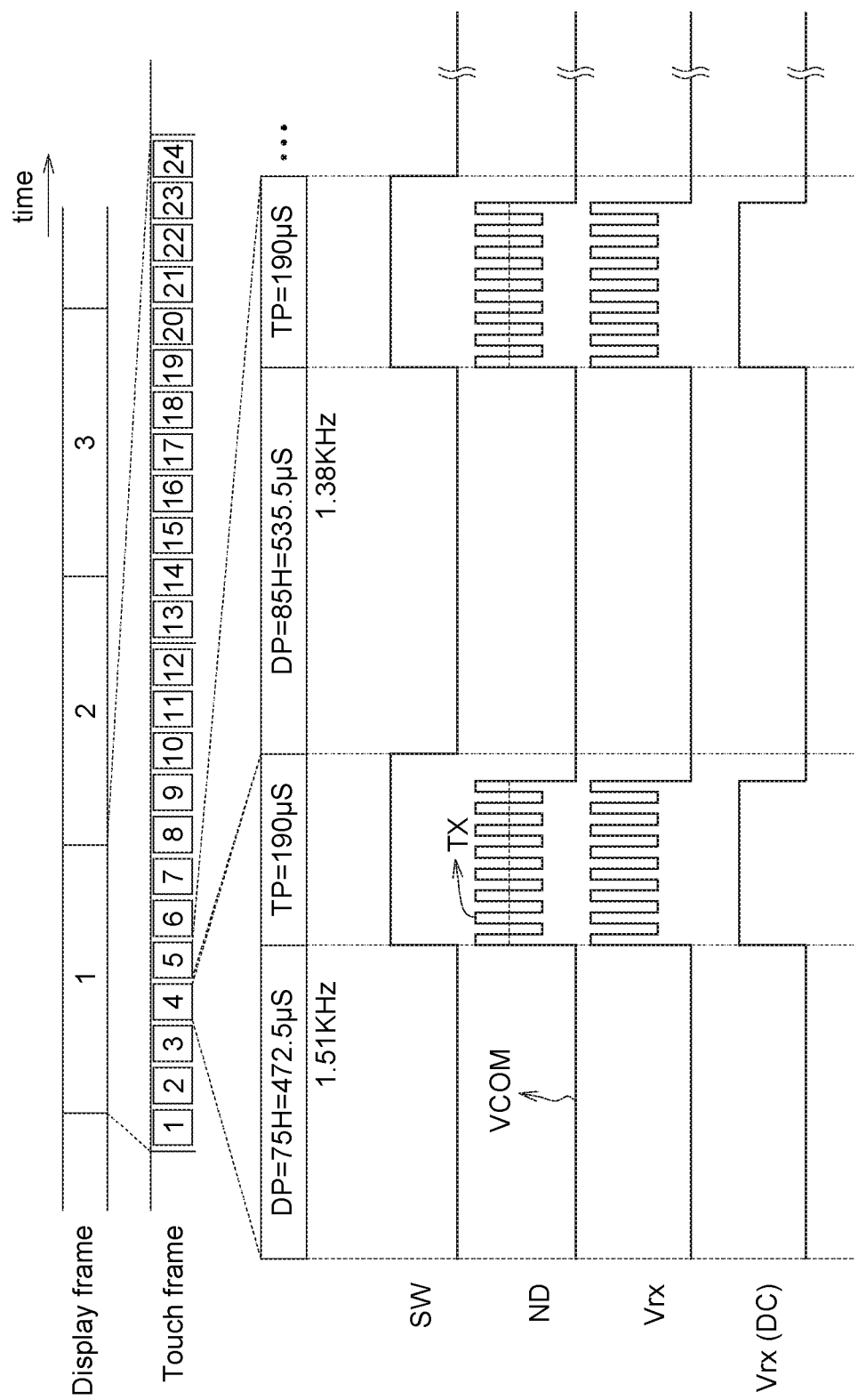
FIG. 9 shows a touch period based display period adjustment within a display frame period according to one embodiment of the invention.

The above embodiments are examples for touch frame based display period adjustment. Another approach is touch period based display period adjustment, which may also achieve a result that a first touch display period and a second touch display period are different in time length. In touch period based display period adjustment, the display periods changes within one touch frame period. At least two different time lengths of the display periods are configured in one touch frame period. FIG. 9 shows a touch period based display period adjustment within a display frame period according to one embodiment of the invention. As shown in FIG. 9, there are 24 touch display periods in a display frame period; 12 touch display periods are in the first touch frame period and the other 12 touch display periods are in the second touch frame period. In the first touch frame period, the 12 display periods may be different in time length in the touch period based adjustment approach. For example, the 4$^{th}$ display period has 75 H, the 5$^{th}$ display period has 85 H, the 6$^{th}$ display period has 70 H (not shown), the 7$^{th}$ display period has 90 H (not shown), and so on. The 12 display periods in the second touch frame period may have at least two different time lengths. The display period setting may have design variations as long as the total number of horizontal display lines in one display frame remains the same. Based on the touch period based display period adjustment, the switching frequency of the display phase and the touch phase in touch display periods of each touch frame period do not always keep in the same 1.44 KHz which brings audible noise. Consequently, the audible noise may be eliminated and may be less heard by the user of the display apparatus 10.

Figure 10:
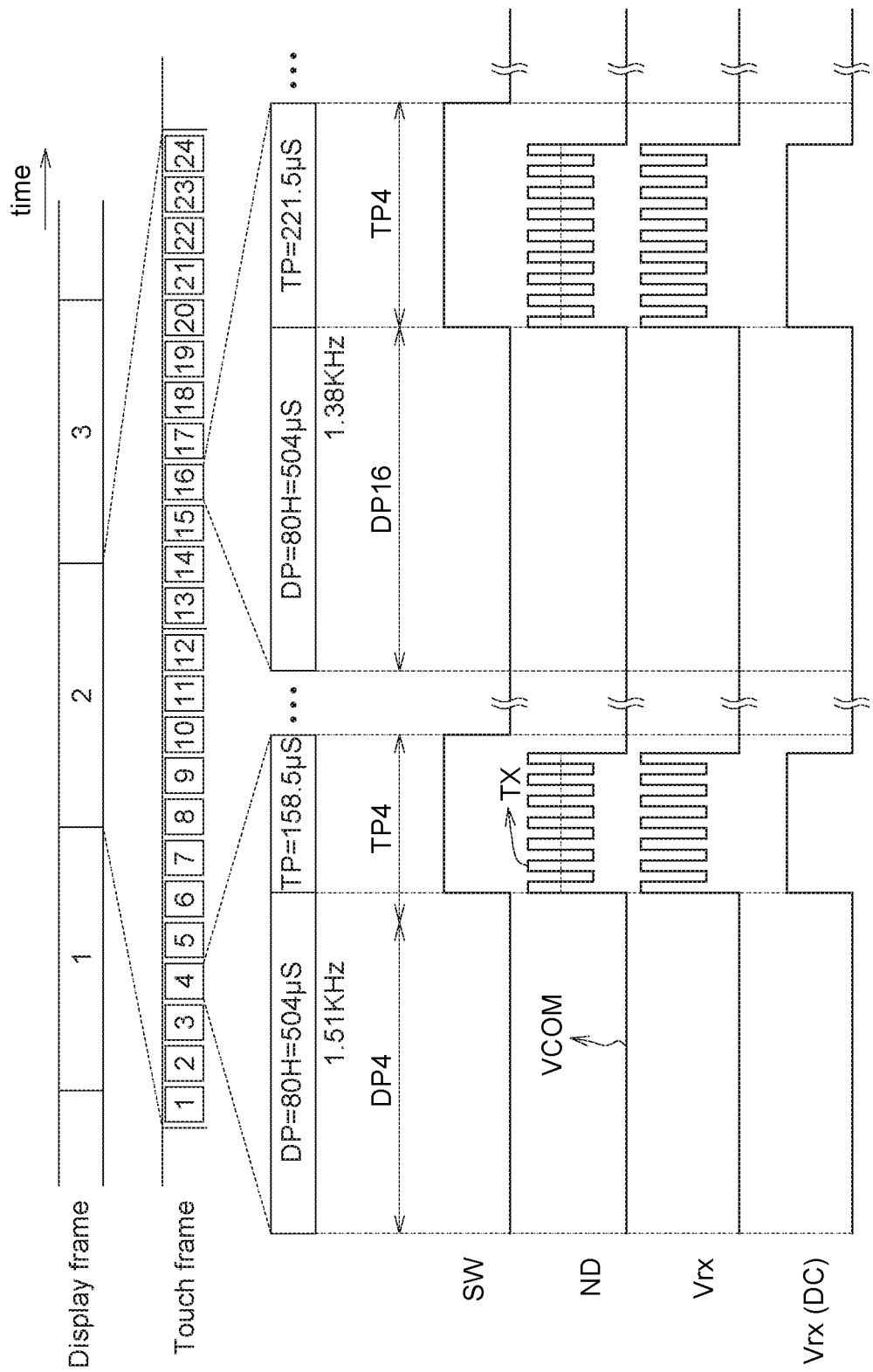
FIG. 10 shows a touch frame based touch period adjustment according to one embodiment of the invention.

The above mentioned touch frame based adjustment and touch period based adjustment are regarding providing touch display periods having different time lengths by providing display periods having different time lengths. In another embodiment, touch display periods having different time lengths may be realized by providing touch periods having different time lengths. FIG. 10 shows a touch frame based touch period adjustment within a display frame period according to one embodiment of the invention. In this embodiment, the display period may be kept at for driving 80 H (e.g., 504 μs) in each touch display period, while the touch period may be different in time length. For example, in a display frame period (display frame period 2 in FIG. 10), 12 touch periods in the first touch frame period may be 158.5 μs, and the 12 touch periods in the second touch frame period may be 221.5 μs. The active period of the touch driving signal TX during the touch periods of the second touch frame period may be longer than the active period of the touch driving signal TX during the touch periods of the first touch frame period. Since the touch periods in the first touch frame period is different from the touch periods in the second touch frame period in time length, the first switching frequency of the display phase and the touch phase in the first touch frame period (1.51 KHz) is different from the second switching frequency of the display phase and the touch phase in the second touch frame period (1.38 KHz). Behaviors related to the switching signal SW, the output signal through the output node ND, the voltage signal Vrx measured on the electrodes of the touch display panel and the DC component Vrx(DC) of the voltage signal Vrx measured on the electrodes can be referred to the description of FIG. 5 and FIG. 6.

Figure 11:
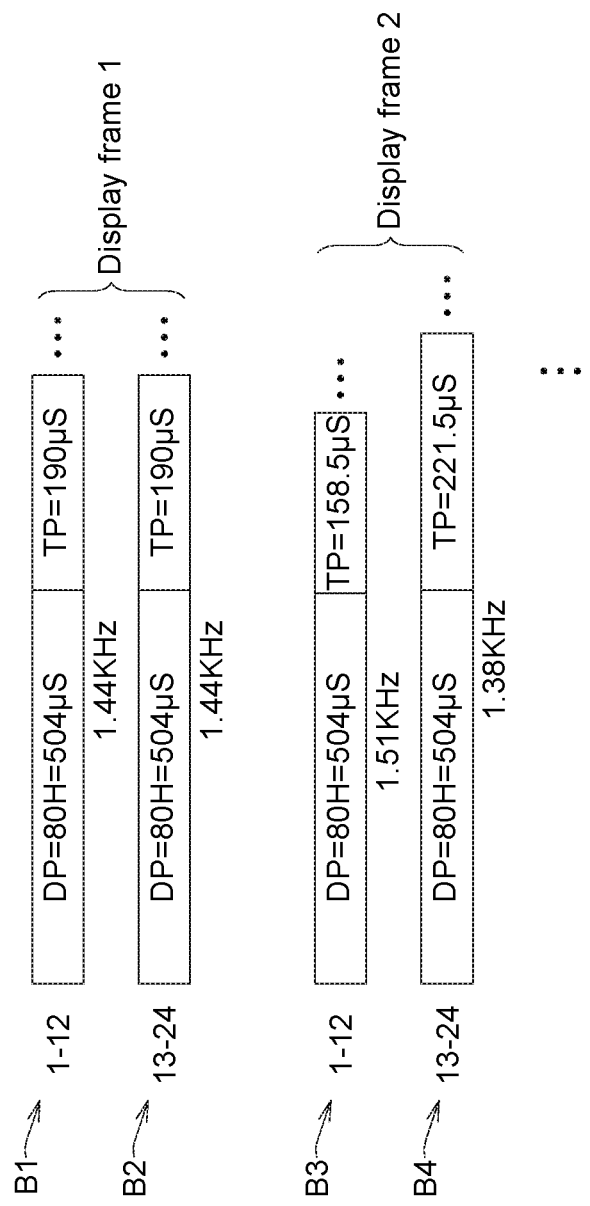
FIG. 11 shows a touch frame based touch period adjustment for multiple display frame periods according to one embodiment of the invention.

FIG. 11 shows a touch frame based touch period adjustment for multiple display frame periods according to one embodiment of the invention. Since different touch frames have touch period with different lengths, the switching frequency of the display phase and the touch phase in a touch frame period B3, 1.51 KHz, is different from the switching frequency of the display phase and the touch phase in a touch frame period B2, 1.44 KHz, and the switching frequency of the display phase and the touch phase in a touch frame period B4, 1.38 KHz, is different from the switching frequency of the display phase and the touch phase in the touch frame period B3, 1.51 KHz. In other words, the switching frequency of the DC component of the output signal output through the output node ND to the touch display panel 120 varies by touch frame periods. The switching frequency of the display phase and the touch phase in all touch frame periods do not always keep in the same 1.44 KHz which brings audible noise. Consequently, the audible noise may be eliminated and may be less heard by the user of the display apparatus 10.

Figure 12:
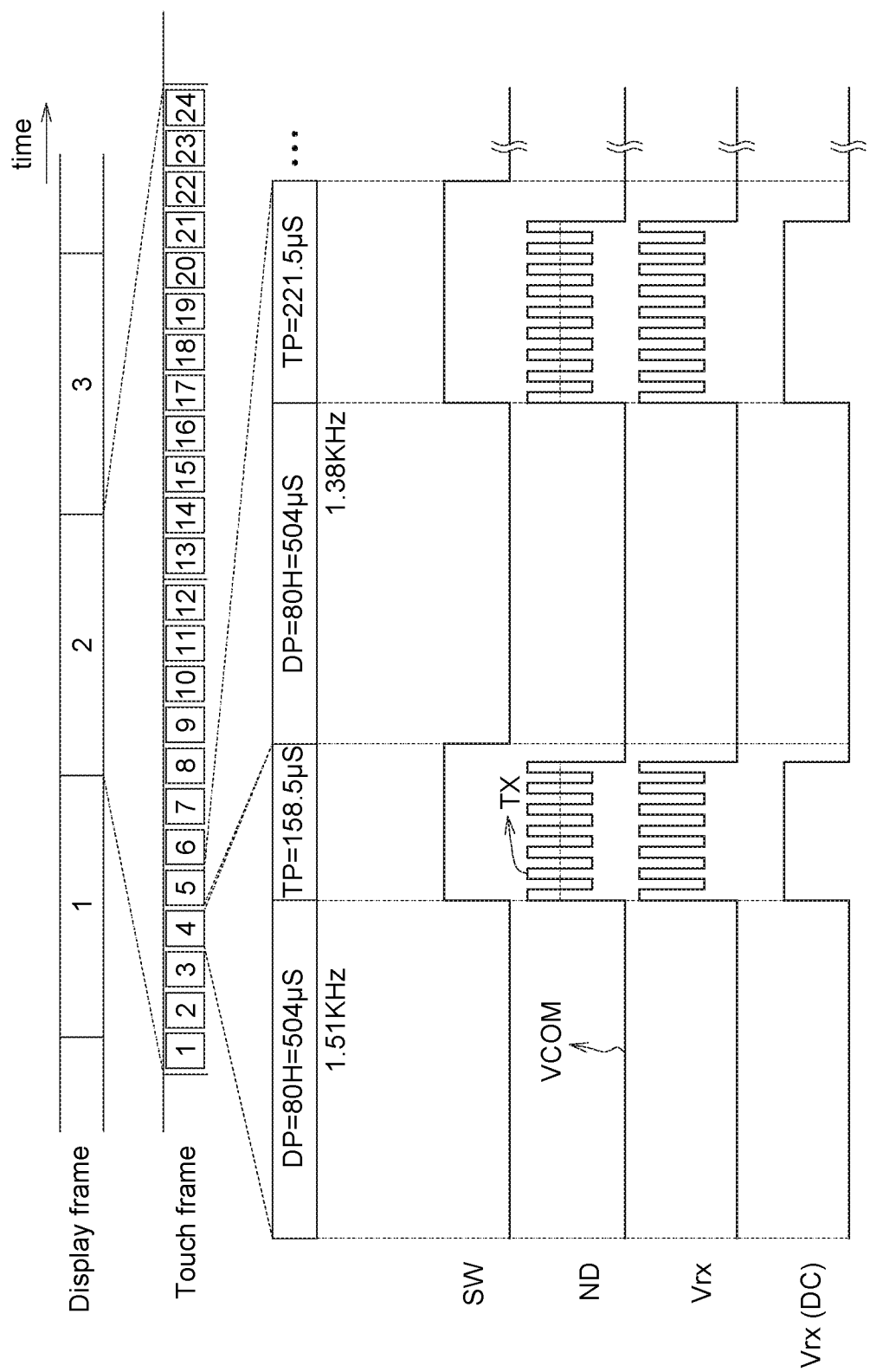
FIG. 12 shows a touch period based touch period adjustment within a display frame period according to one embodiment of the invention.

Another approach is touch period based touch period adjustment, which may also achieve a result that a first touch display period and a second touch display period are different in time length. FIG. 12 shows a touch period based touch period adjustment within a display frame period according to one embodiment of the invention. As shown in FIG. 12, there are 12 touch periods in each touch frame period. At least two different time lengths of the touch periods are configured in one touch frame period. For example, in the first touch frame period, the 12 TPs may be different in time length in the touch period based adjustment approach. For example, the 1$^{st}$ TP has 190 μs, the 2$^{nd}$ TP has 190 μs, the 4$^{th}$ touch period has 158.5 μs, the 5$^{th}$ touch period has 221.5 μs, and so on. The 12 touch periods in the second touch frame period may also have at least two different time lengths. The touch period setting may have design variations as long as the performance of touch sensing is acceptable. Based on the touch period based touch period adjustment, the switching frequency of the display phase and the touch phase in touch display periods of each touch frame period do not always keep in the same 1.44 KHz which brings audible noise. Consequently, the audible noise may be eliminated and may be less heard by the user of the display apparatus 10.

It is noted that, according to embodiments of the present invention, whatever the touch frame based adjustment or touch period based adjustment is used, touch scan is not limited to be performed by touch electrode columns but can also be performed by touch electrode rows.

No matter the touch frame based adjustment or the touch period based adjustment is adopted, the spectrum of the DC component of the output signal (VCOM or TX) output through the output node ND spreads over multiple different frequency components, rather than exhibiting specific switching frequency fsw (1.44 KHz in the example) and its harmonic tones which are easily heard by the user. In other words, the energy of audible noise originally concentrated on the specific frequencies fsw, 2×fsw, 3×fsw and so on now becomes dispersed over different frequency components. Therefore, the audible noise can be reduced in the touch display panel.

Since the audible noise is induced by the DC component of the output signal through the output node, the time length configurations with respect to the touch display period should be various and more enough for the spreading spectrum of the origin of audible noise. In other words, the quantity of time length configurations with respect to the touch display periods has to be large enough to result in an effect of reducing audible noise.

Generally, the quantity of time length configurations (N) with respect to the touch display periods is larger than two, and the quantity of time length configurations (N) is a limited number. Ideally, the more the quantity of time length configurations with respect to the touch display periods is, the better effect of the audible noise suppression can be achieved.

For example, it is assumed that, based on a touch frame based display period adjustment, the driving apparatus may use following time lengths of display periods, [240 H, 240 H], [228 H, 252 H], [244 H, 236 H], and [232 H, 248 H], wherein the first number (such as 228 H) and the second number (such as 252 H) are the time lengths (represented by the number of horizontal display lines) of display periods respectively in the first touch frame period and the second touch frame period of a display frame period, respectively. In this example, the time length of a touch period may be set the same as 30 H. That is, there are 7 different time length configurations represented by (display period, touch period), including (240 H, 30 H), (228 H, 30 H), (252 H, 30 H), (244 H, 30 H), (236 H, 30 H), (232 H, 30 H), and (248 H, 30 H).

In another embodiment, in the various time length configurations of touch display periods, the time lengths of the touch periods are configured to be different, and the time lengths of the display periods are configured to be the same. For example, the time lengths of the display periods are configured to be the same as 240 H, and the time lengths of the touch periods are configured to be 7 different length configurations, which may be in an acceptable range, such as 10 H to 60 H. In still another embodiment, in the various time length configurations of touch display periods, the time length of at least one of the display periods is configured to be different from the time lengths of others of the display periods. Moreover, the time length of at least one of the touch periods is configured to be different from the time lengths of others of the touch periods.

Figure 13:
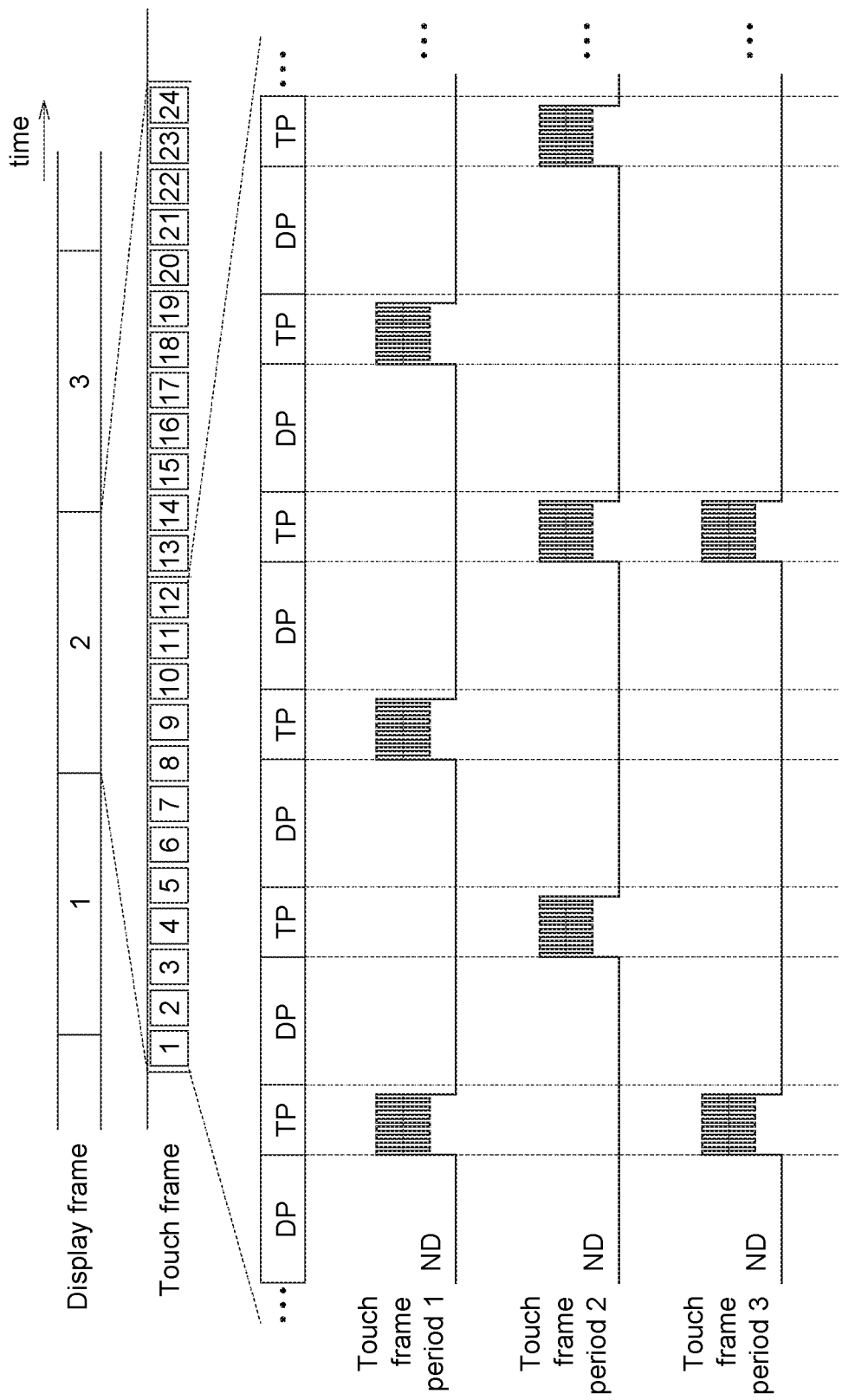
FIG. 13 shows a touch period configuration according to one embodiment of the invention.

FIG. 13 shows a touch period configuration according to one embodiment of the invention. The touch period configuration may be applied to the driving apparatus 110 as illustrated in FIG. 3 and FIG. 4 to eliminate audible noise. In FIG. 13, a display frame period equals two touch frame periods, and three touch frame periods 1 to 3 are illustrated as an example. Each touch frame period has 12 touch display periods, equivalent to 12 display periods and 12 touch periods alternately arranged. For each touch frame period, the touch driving signal TX is output to the touch display panel during some of the touch periods rather than output to the touch display panel during every touch period. In other words, in some of the touch periods, the touch driving signal TX is not output to the touch display panel, and in these moments the output signal through the output node ND to the touch display panel may be kept in a touch sensing inactive level, or in a level same as the common reference voltage, as the example given in FIG. 13. The touch periods during which the touch driving signal TX is output to the touch display panel may have different chronological orders in different touch frame periods. Regarding to each touch frame period having the $1^{st}$ touch period to the $12^{th}$ touch period, the chronological order means $1^{st}, 2^{nd}, 3^{rd}, \ldots 12^{th}$.

A general expression of the touch period configuration of this embodiment is in the following. In a first touch frame period having K touch periods, the touch driving signal TX is output to the touch display panel through the output node ND during N touch periods and is not output to the touch display panel during M touch periods, wherein K, M, N are integers and K=M+N; and in a second touch frame period having K touch periods, the touch driving signal TX is output to the touch display panel through the output node ND during P touch periods and is not output to the touch display panel during Q touch periods, wherein P and Q are integers and K=P+Q. In addition, in the first touch frame period and in the second touch frame period, the common reference voltage VCOM is output to the touch display panel during K display periods of the first touch frame period and the K display periods of the second touch frame period. The touch period configuration can be realized in the driving apparatus 110 of FIG. 4. The switching signal SW is at a first voltage level (e.g. logic low level) during the K display periods of the first touch frame period and the K display periods of the second touch frame period, for providing the common reference voltage to the touch display panel, and the switching signal SW is at a second voltage level (e.g., logic high level) during the N touch periods of the first touch frame period and the P touch periods of the second touch frame period, for providing the touch driving signal to the touch display panel.

In an example, K=12, and M=6, N=6, P=6, Q=6, in the first touch frame period, the N(=6) touch periods during which the touch driving signal TX is output may have chronological orders $1^{st}, 3^{rd}, 5^{th}, 7^{th}, 9^{th}$ and $11^{th}$, and in the second touch frame period, the P(=6) touch periods during which the touch driving signal TX is output may have different chronological orders $2^{nd}, 4^{th}, 6^{th}, 8^{th}, 10^{th}$ and $12^{th}$. Further, the touch driving signal TX may be output during a different number of touch periods (which is not necessary to be a half of the total touch periods) of a third touch frame period, such as only 5 touch periods with chronological orders $1^{st}, 4^{rd}, 6^{th}$ and $11^{th}$ which are also different from those chronological orders of touch periods in the first or the second touch frame. Such a touch period configuration may bring an effect that the spectrum of the DC component of the output signal output through the output node ND does not concentrate in the frequency such as 1.44 KHz and its harmonics but spreads over different frequency components, which can eliminate audible noise.

Other embodiments of the invention as illustrated in FIG. 14 to FIG. 17 may involve varying waveform of the touch driving signal TX in the touch phase. The touch driving signal TX has a first waveform during a first touch period of a plurality of touch periods and has a second waveform during a second touch period of the touch periods, and the first waveform is configured to be different from the second waveform. It is noted that the first touch period and the second touch period may be in different touch frame periods or in the same touch frame period. The first waveform of the touch driving signal TX may be different from the second waveform of the touch driving signal TX by a maximum level or a minimum level, an active period, frequency, or voltage swing (or p-p amplitude). The following embodiments in FIG. 14 to FIG. 17 are also illustrated based on an assumption that one display frame period equals two touch frame periods and a display frame rate 60 Hz.

Figure 14:
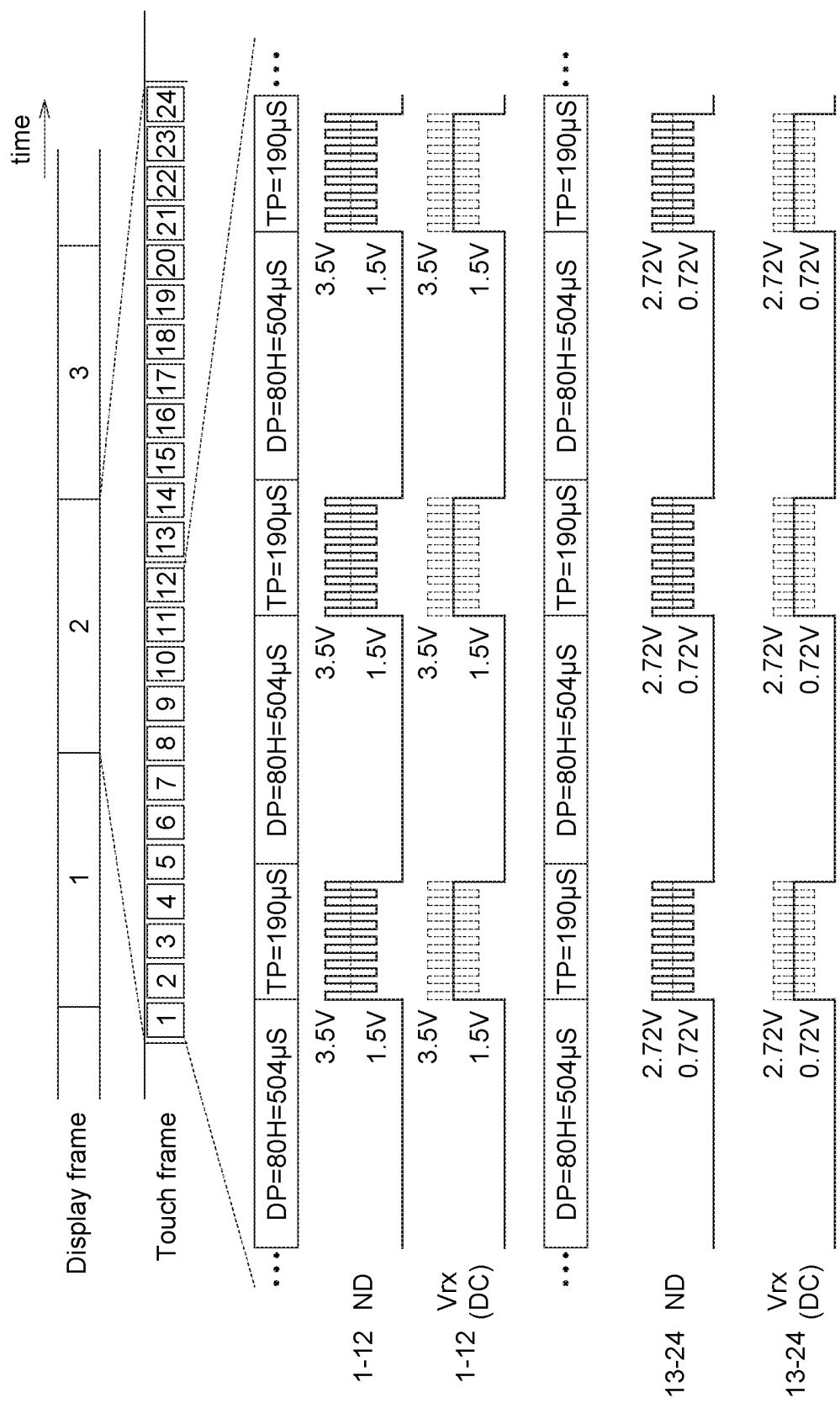
FIG. 14 shows a touch frame based adjustment for the maximum level and the minimum level of the touch driving signal according to one embodiment of the invention.

FIG. 14 shows a touch frame based adjustment for the maximum level or the minimum level of the touch driving signal according to one embodiment of the invention. At least one of a maximum level and a minimum level of the touch driving signal TX during a first touch period is configured to be different from at least one of a maximum level and a minimum level of the touch driving signal TX during the second touch period. Herein, the maximum levels in different touch periods may be different, or the minimum levels in different touch periods may be different. In the example of FIG. 14, in every touch period of the first touch frame period, the maximum level and the minimum level of the touch driving signal TX are 3.5V and 1.5V respectively, and thus the DC component of the touch driving signal TX is 2.5V. In every touch period of the second touch frame period, the maximum level and the minimum level of the touch driving signal TX are 2.72V and 0.72V respectively, and thus the DC component of the touch driving signal TX is 1.72V. It is noted that as long as at least one of the maximum level and the minimum level of the touch driving signal TX is reduced, the DC component of the touch driving signal TX is reduced. The proposed touch frame based adjustment for the maximum level or the minimum level of the touch driving signal TX may reduce the DC component of the touch driving signal TX. Reduction in the DC component of the touch driving signal TX results in decreased audible noise energy. Since the output signal through the output node ND in the touch phase equals the touch driving signal TX, by this embodiment, the DC component of the output signal through the output node ND in the touch phase may be different and reduced by touch frame periods. In another aspect, the DC component of the voltage signal measured on touch electrodes of the touch display panel may be different and reduced by touch frame periods.

Figure 15:
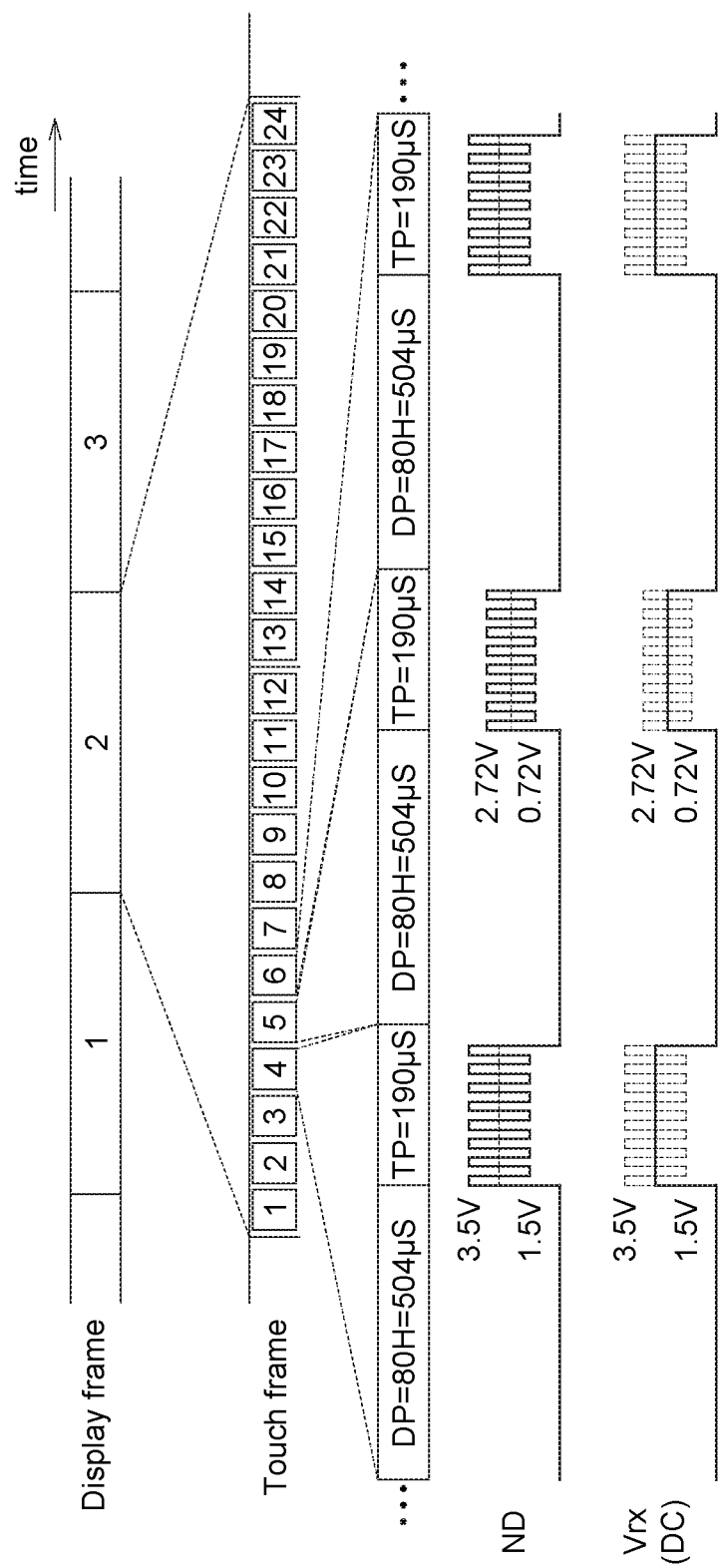
FIG. 15 shows a touch period based adjustment for the maximum level and the minimum level of the touch driving signal according to one embodiment of the invention.

FIG. 15 shows a touch period based adjustment for the maximum level or the minimum level of the touch driving signal according to one embodiment of the invention. In the example of FIG. 15, the maximum level and the minimum level of the touch driving signal TX may be set as 3.5V and 1.5V respectively in the touch period TP4, and the maximum level and the minimum level of the touch driving signal TX may be set as 2.72V and 0.72V respectively in the touch period TP5, where TP4 and TP5 are in the same touch frame period. The maximum level and the minimum level of the touch driving signal TX for each touch period may be set according to a repeated pattern (for example, the maximum level and the minimum level in the touch periods TP6 and TP7 may be set as the same as those in the touch periods TP4 and TP5 respectively) or may be set randomly. The proposed touch period based adjustment for the maximum level or the minimum level of the touch driving signal TX may reduce the DC component of the touch driving signal TX. Reduction in the DC component of the touch driving signal TX results in decreased audible noise energy.

To implement the different configurations of the maximum level and the minimum level of the touch driving signal TX, in one embodiment, the driving apparatus 110 may include multiple registers for storing different maximum levels and/or different minimum levels of the touch driving signal TX. The touch regulator circuit 117 may generate the touch driving signal TX according to the values stored in the registers associated with the maximum level and the minimum level of the touch driving signal TX.

Figure 16:
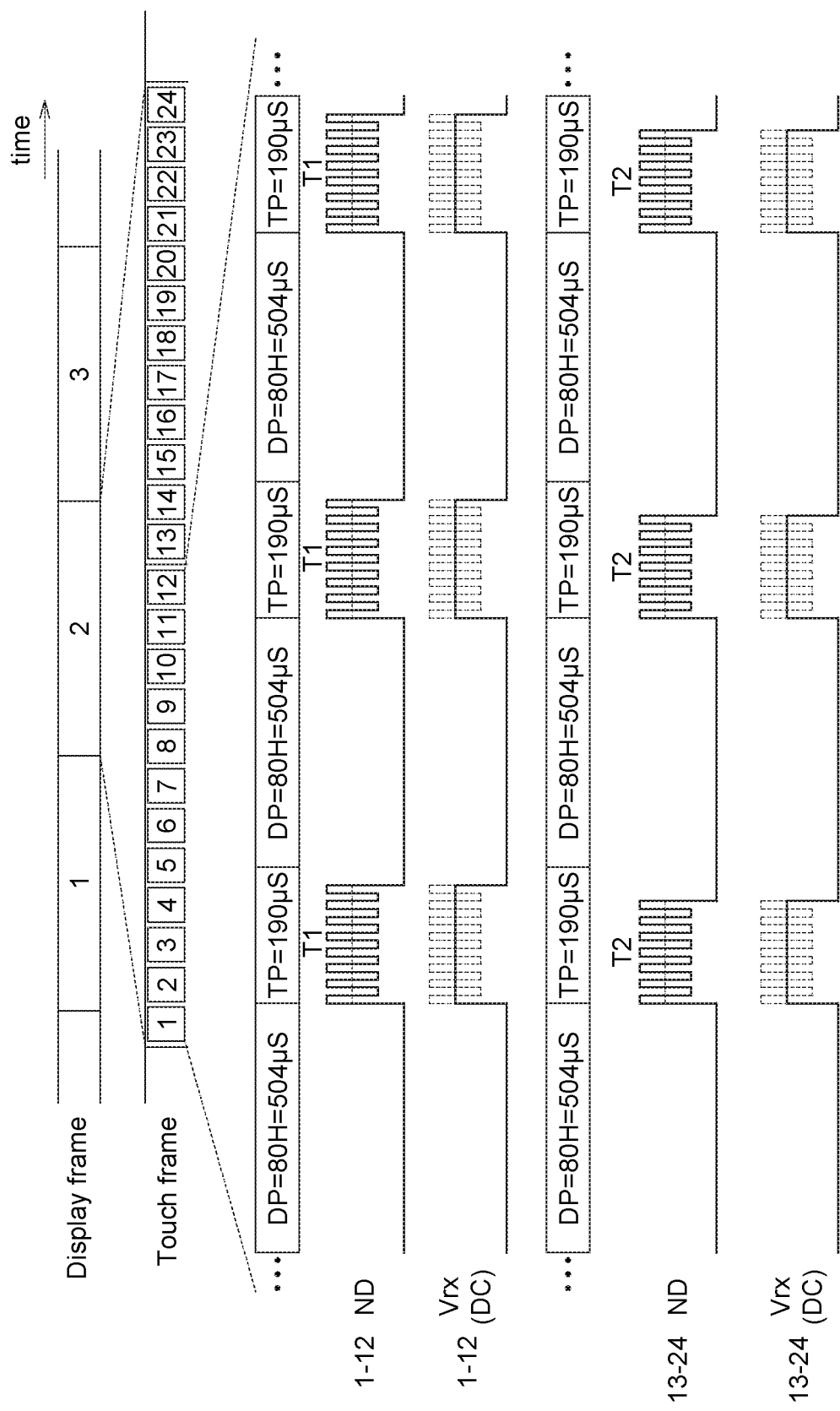
FIG. 16 shows a touch frame based adjustment for the active period of the touch driving signal according to one embodiment of the invention.

FIG. 16 shows a touch frame based adjustment for the active period of the touch driving signal according to one embodiment of the invention. The active period of the touch driving signal may be corresponding to an actual touch sensing time length in the touch phase. According to this embodiment, the active period of the touch driving signal TX during a first touch period, called a first active period, is configured to be different from the active period of the touch driving signal TX during a second touch period, called a second active period. In the example of FIG. 16, in every touch period of the first touch frame period, the active period of the touch driving signal is T1 (the first active period), which may be shorter than the touch period=190 μs. For example, T1=170 μs. In every touch period of the second touch frame period, the active period of the touch driving signal is T2 (the second active period), which is shorter than T1. For example, T2=140 μs. Since the active period of the touch driving signal TX is different by touch frame periods, the switching frequency of the DC component of the output signal output through the output node ND is different by touch frame periods accordingly. This embodiment may bring an effect that the spectrum of the DC component of the output signal output through the output node ND does not concentrate in the frequency such as 1.44 KHz and its harmonics but spreads over different frequency components, which can eliminate audible noise.

Figure 17:
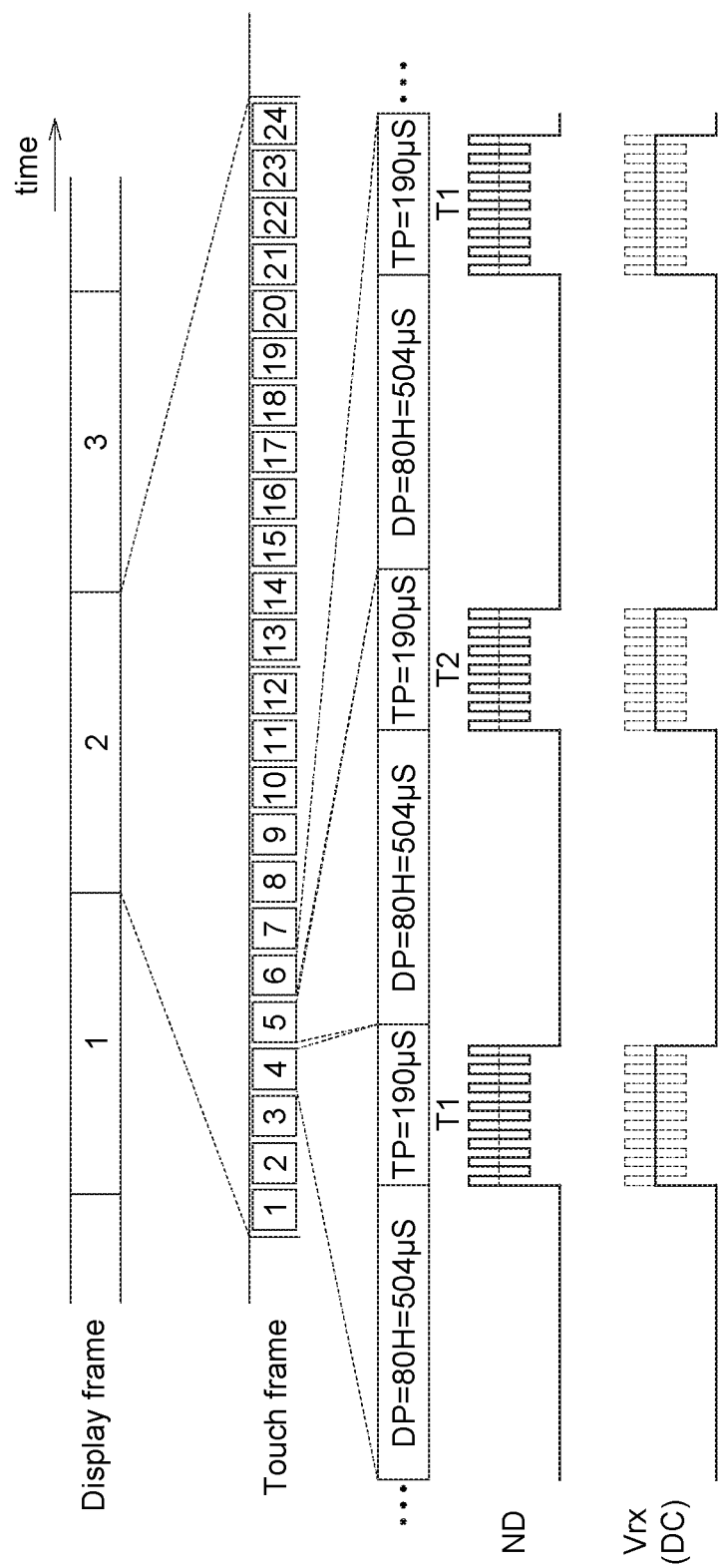
FIG. 17 shows a touch period based adjustment for the active period of the touch driving signal according to one embodiment of the invention.

FIG. 17 shows a touch period based adjustment for the active period of the touch driving signal according to one embodiment of the invention. In the example of FIG. 17, the active period of the touch driving signal TX may be set as T1 (the first active period) in the touch period TP4, and the active period of the touch driving signal may be set as T2 (the second active period) in the touch period TP5, where TP4 and TP5 are in the same touch frame period and T1 is not equal to T2. That is, in a touch frame period there are at least two active periods different in time length. The active period for each TP may be set according to a repeated pattern (for example, the active period in the touch periods TP6 and TP7 may be set as the same as those in the touch periods TP4 and TP5 respectively) or may be set randomly. Since the active period of the touch driving signal TX is different by touch periods, the switching frequency of the DC component of the output signal output through the output node ND is different by touch periods accordingly. This embodiment may also eliminate audible noise.

To implement the different configurations of the active period of the touch driving signal TX, in one embodiment, the touch regulator circuit 117 may generate the touch driving signal TX following corresponding active period setting. In another embodiment, the timing control circuit 113 may generate the switching signal SW which can control output status of the touch driving signal TX at the output node ND, and in such a way the time length of the active period of the touch driving signal TX at the output node ND can be determined according to the switching signal SW.

In another embodiment, a first voltage swing of the touch driving signal TX during a first touch period is configured to be different from a second voltage swing of the touch driving signal TX during a second touch period. In this embodiment, the first touch period and the second touch period may be in different touch frame period or in the same touch frame periods. A touch framed based adjustment or a touch period based adjustment may be applied to the configuration of the voltage swing of the touch driving signal. A reduced voltage swing of the touch driving signal may help reduce audible noise.

In another embodiment, a first frequency of the touch driving signal during the first touch period is configured to be different from a second frequency the touch driving signal during the second touch period. In this embodiment, the first touch period and the second touch period may be in different touch frame period or in the same touch frame periods. A touch framed based adjustment or a touch period based adjustment may be applied to the configuration of the frequency of the touch driving signal. A reduced frequency of the touch driving signal may help reduce audible noise.

Figure 18:
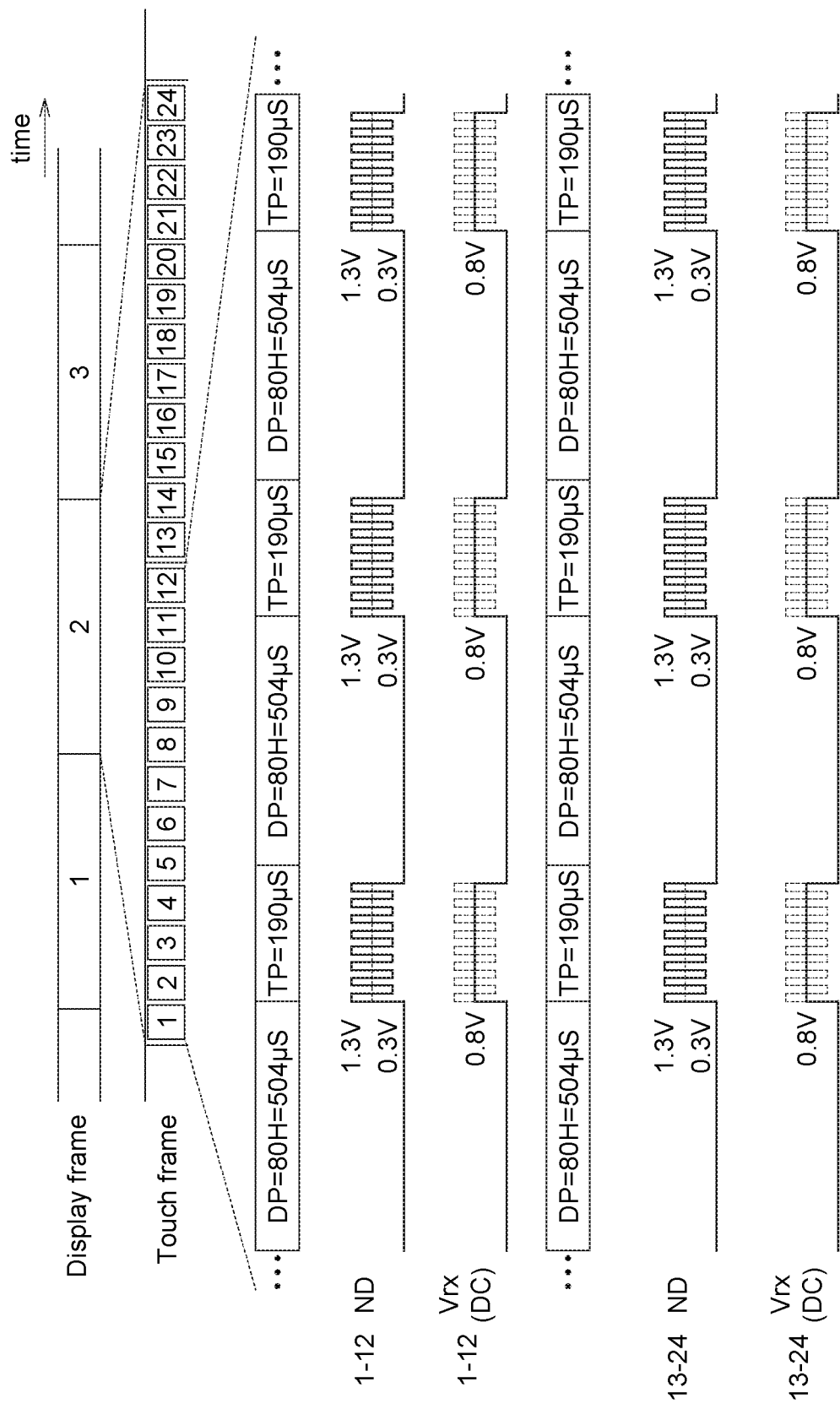
FIGS. 18 and 19 show configurations of the maximum level and the minimum level of the touch driving signal according to one embodiment of the invention.
Figure 19:
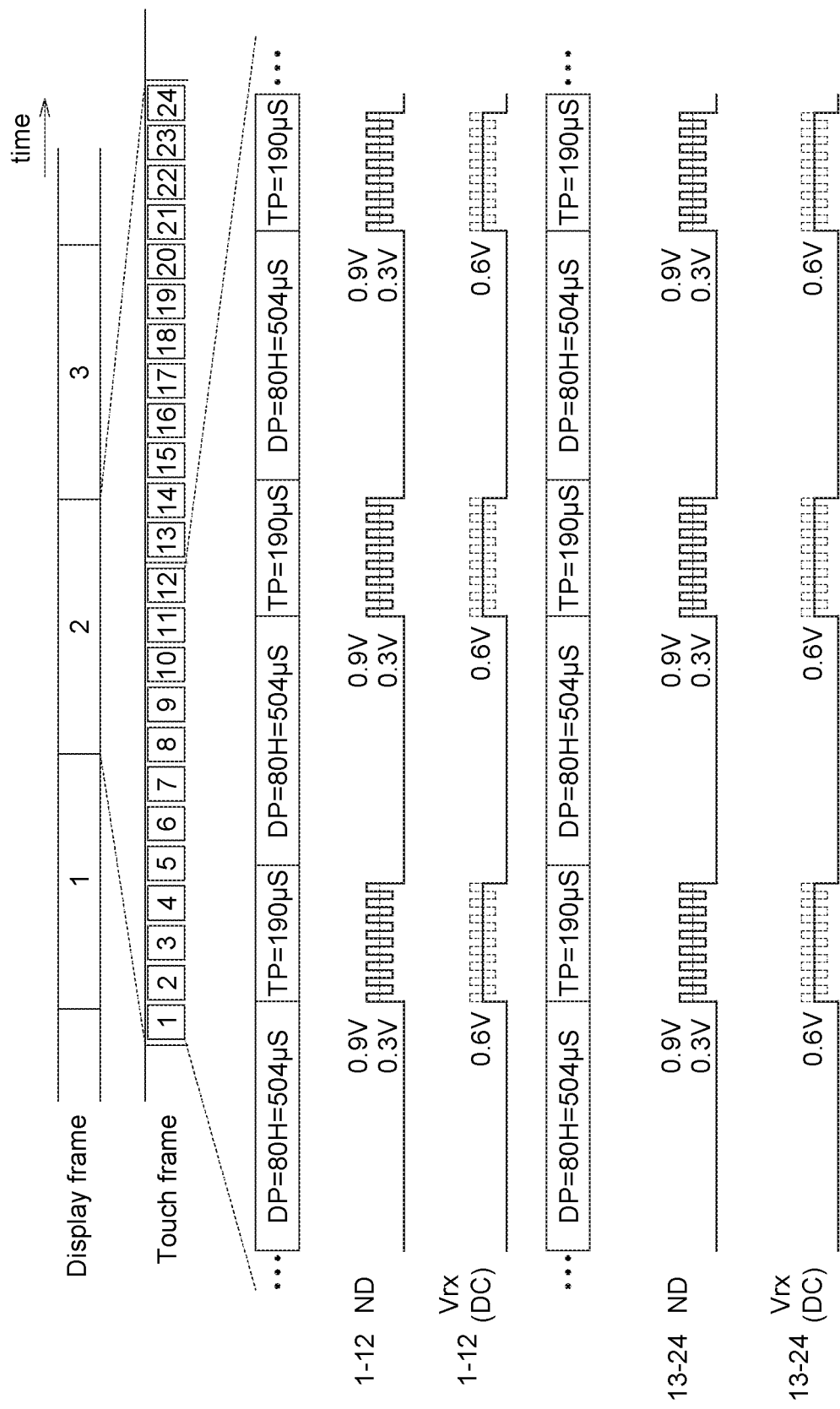

FIGS. 18 and 19 show configurations of the maximum level and the minimum level of the touch driving signal according to one embodiment of the invention. In this embodiment, the touch driving signal has a configurable DC component during the touch periods, and the DC component of the touch driving signal is configured to be low enough to result in an effect of reducing audible noise. To realize the configurable DC component of the touch driving signal, one of the embodiments is to store the maximum level and the minimum level of the touch driving signal (represented by digital values) in registers in the driving apparatus. The developer of the driving apparatus may determine the maximum level and the minimum level of the touch driving signal based on the requirement of the touch display panel. Alternatively speaking, both the maximum level and the minimum level of the touch driving signal are configurable. The touch regulator circuit (117 in FIG. 5) may generate the touch driving signal according to the maximum level and the minimum level stored in the registers.

As shown in FIG. 18, the maximum level and the minimum level of the touch driving signal are not varied with the touch frame periods nor the touch display periods. The maximum level and the minimum level of the touch driving signal are respectively configured to be constant 1.3V and constant 0.3V. Such configuration may result in a DC component 0.8V, which may be a DC component low enough to result in an effect of reducing audible noise.

As shown in FIG. 19, the maximum level and the minimum level of the touch driving signal are respectively configured to be constant 0.9V and constant 0.3V. Such configuration may result in a DC component 0.6V that is even lower than the DC component of the touch driving signal in FIG. 18, thereby may have a better effect of reducing audible noise. As shown in FIGS. 18 and 19, the maximum level and the minimum level of the touch driving signal are configurable, so as the DC component of the touch driving signal during the touch periods.

It is noted that reducing the voltage swing (p-p amplitude) of the touch driving signal may also decrease the touch sensing precision. There may be a compromise between reducing the DC component of the touch driving signal for audible noise suppression and maintaining acceptable touch sensing precision.

It is noted that the above-mentioned embodiments of the present invention may apply to a touch display panel using self-capacitance touch sensing or mutual capacitance touch sensing.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A driving method for a driving apparatus to drive a touch display panel, wherein the driving method comprises steps of:

outputting a common reference voltage to the touch display panel during a plurality of display periods in a plurality of touch display periods; and outputting a touch driving signal to the touch display panel during a plurality of touch periods in the plurality of touch display periods, wherein the touch driving signal has a configurable direct current (DC) component during the touch periods, wherein the display periods and the touch periods are alternately arranged and each of the touch display periods has one of the display periods and one of the touch periods, wherein the DC component of the touch driving signal is configured to be low enough to result in an effect of reducing audible noise, wherein the DC components of the touch driving signal in the touch periods are equivalent.

2. The driving method according to claim 1, wherein in the configurable DC component of the touch driving signal is determined based on a configurable maximum level and a configurable minimum level.

3. A driving apparatus for driving a touch display panel, comprising:

a first voltage generating circuit, configured to output a common reference voltage to the touch display panel during a plurality of display periods in a plurality of touch display periods; and a second voltage generating circuit, configured to output a touch driving signal to the touch display panel during a plurality of touch periods in the plurality of touch display periods, wherein the touch driving signal has a configurable direct current (DC) component during the touch periods, wherein the display periods and the touch periods are alternately arranged and each of the touch display periods has one of the display periods and one of the touch periods, wherein the DC component of the touch driving signal is configured to be low enough to result in an effect of reducing audible noise, wherein the DC components of the touch driving signal in the touch periods are equivalent.

4. The driving apparatus according to claim 3, wherein the configurable DC component of the touch driving signal is determined based on a configurable maximum level and a configurable minimum level.

* * * * *